(12) United States Patent
Aritomi

(10) Patent No.: US 9,092,178 B2
(45) Date of Patent: Jul. 28, 2015

(54) PRINTING SYSTEM, CONTROL METHOD THEREOF, AND STORAGE MEDIUM FOR PRINTING FROM A MOBILE TERMINAL

(71) Applicant: CANON KABUSHIKI KAISHA, Tokyo (JP)

(72) Inventor: Masanori Aritomi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/171,871

(22) Filed: Feb. 4, 2014

(65) Prior Publication Data

US 2014/0233058 A1 Aug. 21, 2014

(30) Foreign Application Priority Data

Feb. 18, 2013 (JP) ................................. 2013-028709

(51) Int. Cl.
*G06F 3/12* (2006.01)
*H04W 4/00* (2009.01)

(52) U.S. Cl.
CPC ............ *G06F 3/1292* (2013.01); *G06F 3/1204* (2013.01); *G06F 3/1238* (2013.01); *G06F 3/1267* (2013.01); *G06F 3/1287* (2013.01); *G06F 3/1288* (2013.01); *H04W 4/008* (2013.01); *G06F 3/1222* (2013.01)

(58) Field of Classification Search
CPC ........... G06F 3/00; G06F 3/12; G06F 3/1201; G06F 3/1202; G06F 3/1203; G06F 3/1204; G06F 3/1205; G06F 3/1224; G06F 3/1229; G06F 3/1237; G06F 3/1278; G06F 3/1285; G06F 3/1292
See application file for complete search history.

(56) References Cited

U.S. PATENT DOCUMENTS

2010/0309504 A1* 12/2010 Partridge et al. ............. 358/1.15

FOREIGN PATENT DOCUMENTS

JP 2007-226344 A 9/2007

OTHER PUBLICATIONS https://developers.google.com/cloud-print/docs/overview?hl=us (Google Cloud Print (Registered trademark) Developers), pp. 1-3, Feb. 3, 2014 (Last updated Nov. 25, 2013).
D. Hardt, Ed., The OAuth 2.0 Authorization Framework, Proposed Standard, Internet Engineering Task Force (IETF), pp. 1-18, Oct. 2012.

* cited by examiner

*Primary Examiner* — Thomas D Lee
(74) *Attorney, Agent, or Firm* — Carter, DeLuca, Farrell & Schmidt, LLP

(57) ABSTRACT

Provided is a printing system in which a mobile terminal that instructs the print service device to print without specifying an image forming device that executes printing in response to a selection of document data, and the print service device transmits a command for causing the terminal device to write, in the near field communication unit of the terminal device, storage information related to a storage location on the network of the print job generated upon receiving the instruction, and the image processing device activates the near field communication unit of the image processing device, and acquires the print job based on the storage information acquired by the acquisition unit and print the print job.

9 Claims, 16 Drawing Sheets

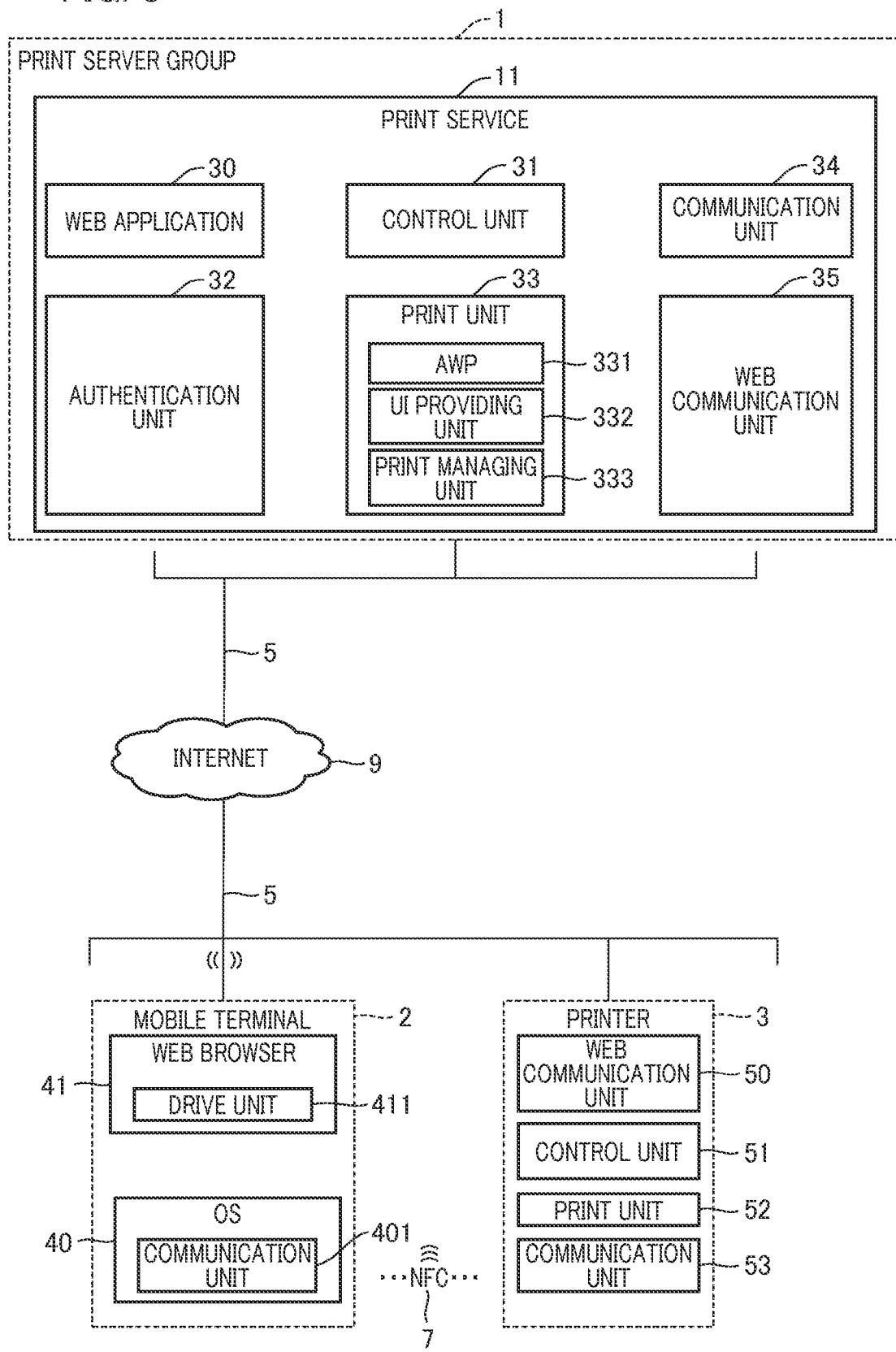

FIG. 7
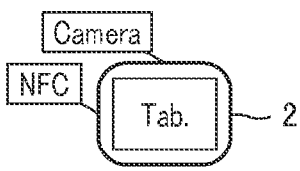
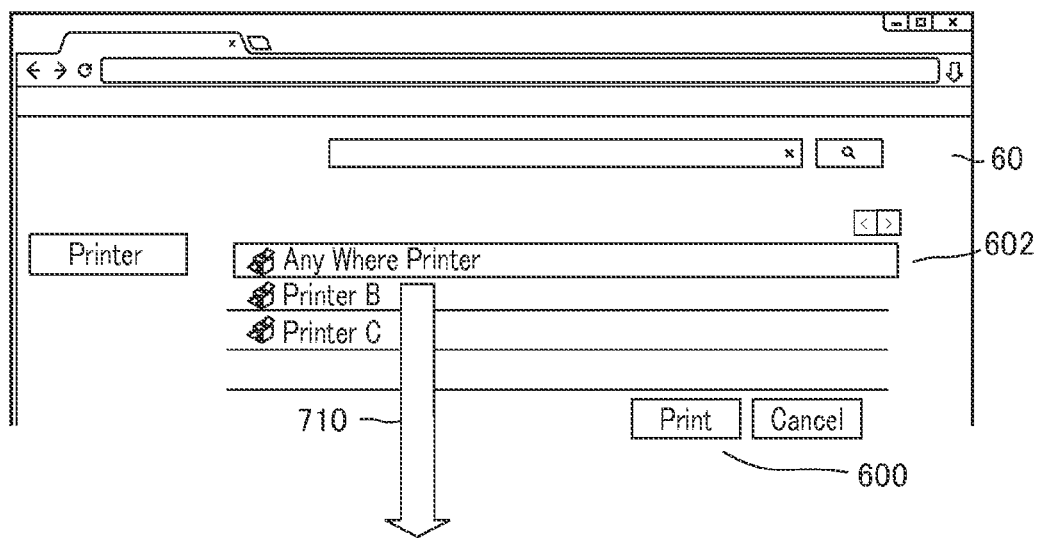
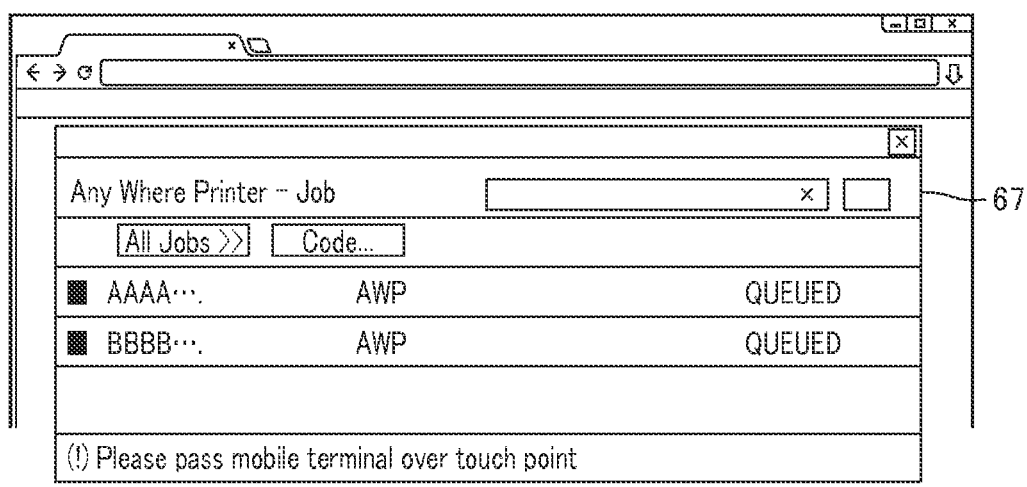

PRINTING SYSTEM, CONTROL METHOD THEREOF, AND STORAGE MEDIUM FOR PRINTING FROM A MOBILE TERMINAL

BACKGROUND OF THE INVENTION

1. Field of the Invention

The present invention relates to a printing system, a control method thereof, and a storage medium.

2. Description of the Related Art

A printing system that utilizes a print server has been proposed. A print server controls the print processing by managing one or more printers positioned on a network, generating a print job on the basis of a print instruction by a user, and transmitting the print job to any one of the printers, to thereby control print processing. The user accesses the print server via a client PC so as to instruct the print processing by a printer managed by the print server. That is, the print server provides the client PC with a print function. In this manner, a configuration in which the server bears portions of functions provided in the client PC instead of the client PC is called "service provision by the server".

Recently, cloud computing has attracted attention. Cloud computing also has a configuration in which the server provides services with the client PC. The main feature of the cloud computing is simultaneously processing requests from many clients by executing data conversion and data processing in a distributed way with many computing resources. Venders emerge who implement services on the cloud computing environment to thereby provide various Web services via the network. For example, Google (Registered trademark) proposes a Web service called Google Cloud Print (Registered trademark) that causes the printer to cooperate with the cloud in addition to the establishment of a number of large data centers. The detailed specification of the Google Cloud Print (Registered trademark) is disclosed in https://developers.google.com/cloud-print/docs/overview?h1=us (Google Cloud Print (Registered trademark) Developers).

Google (Registered trademark) has developed a mechanism for data communication in order to provide a service by cooperating with image processing devices and published an interface for performing the data communication by the image forming devices with the cloud computing environment prepared by Google (Registered trademark). For example, if the printer implements the interface, the printer and the server are connected via an Internet, whereby the user can cause the printer to acquire data on the network via the client PC and execute printing.

Additionally, a mobile terminal such as a tablet and the like as an information terminal that utilizes the service provided by the print server has attracted attention. The mobile terminal has a tendency to be applied to office uses in addition to the past consumer use. The mobile terminal used in the office is carrying out near field communication (NFC) for logistics or a security. Japanese Patent Application Laid-Open No. 2007-226344 discloses a print device that acquires image data to be printed from a mobile device through near field communication.

In particular, in the case of office use, the printer may be often shared by a plurality of users. Also, there are often cases in which each user uses a plurality of printers. Thus, an environment is enlarged in which a pull printing function, an anywhere printing function and the like, in addition to a push printing function that is a normal printing are utilized. As just described, there is an increase in the utilization of the mobile terminal that carries out the NFC with respect to the terminal that connects the cloud service. Also, a utilization of the pull printing function and the anywhere printing function increases in the printer used in the office.

However, even if the anywhere printing function is used when the user provides an instruction for printing from the mobile terminal by using the aforementioned print service, the user must operate the printer such as an overlapped print document selection, resulting in an increase of operation processing.

SUMMARY OF THE INVENTION

The printing system of the present invention causes a printer to execute printing without a user operation on the printer when the user provides an instruction for printing from a mobile terminal by using an anywhere printing function.

A printing system of one aspect of the present invention includes a print service device that transmits a print job generated based on document data to an image processing device via a network; a terminal device that includes a non-contact near field communication unit; and the image processing device that includes the non-contact near field communication unit. The terminal device comprises an instruction unit configured to instruct the print service device to print without specifying the image processing device that executes printing in response to a selection of the document data. The mains service device comprises a transmission unit configured to transmit a command for causing the terminal device to write, in the near field communication unit of the terminal device, storage information related to a storage location on the network of the print job generated upon receiving the instruction. The image processing device comprises an acquisition unit configured to initiate communication through the near field communication unit of the image processing device so as to acquire the storage information written in the near field communication unit of the terminal device, and a print unit configured to acquire the print job based on the storage information acquired by the acquisition unit and print the print job.

Further features of the present invention will become apparent from the following description of exemplary embodiments with reference to the attached drawings.

BRIEF DESCRIPTION OF THE DRAWINGS

FIG. 3 is a block diagram illustrating an example of a software configuration of a printing system.

FIG. 7 illustrates another example of the print job screen display by the printing system.

DESCRIPTION OF THE EMBODIMENTS

Detailed Description of Problems

Figure 1:
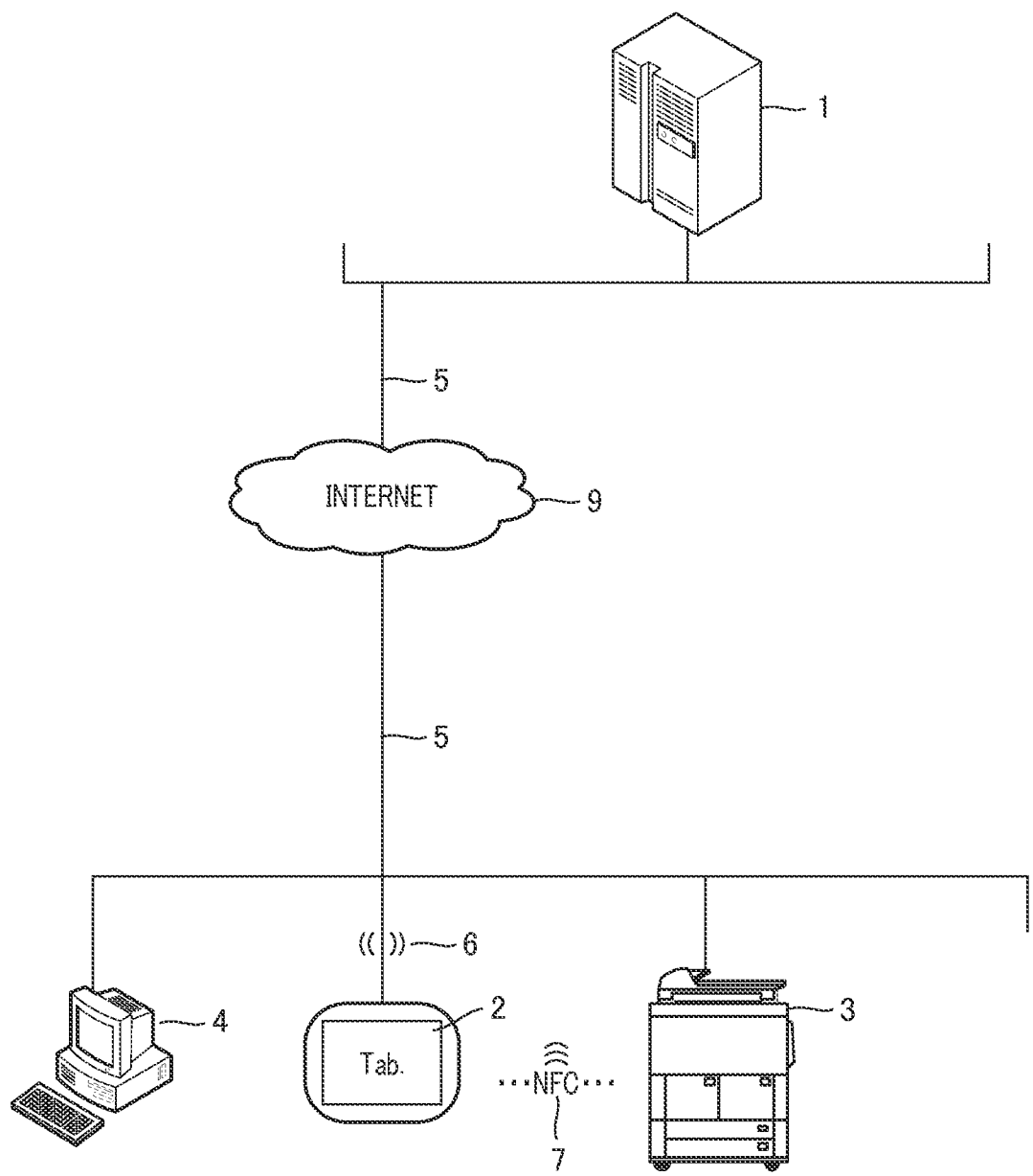
FIG. 1 illustrates an example of a configuration of a printing system.

As described above, the utilization of the pull printing function and the anywhere printing function in printers installed for use in an office has increased. The anywhere printing function is a print function in which a user performs a print instruction without deciding a printer by using an application provided in a mobile terminal, and provides an instruction about an output at a desired printer. A job generated by the print instruction is temporarily stored on the server. Then, when the user logs in any printer and requests the pull printing, the printer acquires the job associated with the login user by inquiring the server so as to execute printing.

In the case of the pull printing, a user provides a print instruction after selecting a printer, while a job (print data) is temporarily stored in a server. Then, when the user provides an output instruction at the selected printer, the printer requests the temporarily stored job in the print service and downloads the print data to thereby output actual printing. This print function is called "pull printing".

An anywhere printing function is a superior function having effects such as an intensive management by the server, control that prevents documents from being left in the printer, and the like. However, when the conventional anywhere printing function is used, there is a tendency to increase operation processes by a user as compared with the normal printing. The reason is that an operation process for selecting a document is imposed in the conventional anywhere printing function as compared with the push printing. In addition, since a user logs into a printer for the pull printing in the conventional anywhere printing function, this leads to a long occupation time of the printer.

The push printing and the pull printing will be compared and discussed with respect to actual print process. First, a description will be given of an example of a process in normal printing, that is, the push printing. In the process in the push printing, a user performs the following operations on a screen provided on a terminal.
(1) Select a document and a printer on a print menu
(2) Execute printing In the push printing, printing is performed by the selected printer when the user performs operations to the print execution (2) with the terminal.

Next, a description will be given of an exemplary conventional pull printing process. In the case of the conventional anywhere printing function, a user operates the operation unit of the printer such as a PIN number input, a touch the operation unit with a card or the like. The conventional anywhere printing function process is as follows:
(1) Select a document and an anywhere printing printer on a print menu
(2) Execute printing
(3) Move to the front of the printer
(4) Input a pin or touch the printer with a card (select the printer)
(5) Operate the printer so that the printer displays a job list on the operation unit
(6) Select a desired job to be printed from the job list
(7) Execute printing When the conventional, anywhere printing function is used, the user has to perform operations up to the print execution (2) with the terminal, and further operate the operation unit provided on the printer after moving to the front of the printer. In other words, when the conventional anywhere printing function is used, the user has to select the document twice. Specifically, the user once selects the document with the terminal, and then the user reselects the document with the operation unit of the printer. Thus, when the anywhere printing function is used, the operation processes, including the document selection, increases, and this leads to the longer occupation time for the operation unit of the printer.

Japanese Patent Application Laid-Open No. 2007-226344 discloses a printing device that acquires print data so be printed from a mobile device through a near field communication. In the near field communication disclosed in Japanese Patent Application Laid-Open No. 2007-226344, the image data is transferred to the printer through an ultra-high bandwidth wireless communication (UWB) having a high-speed. However, it is inefficient for the mobile terminal that uses the print service to receive a print job from the print service, and then transfer the print job to the printer. Further, an NFC in which installation to the mobile terminal has begun is currently configured to the communication distance, a power consumption, and a communication speed to a low level. Thus, if the mobile terminal and the printer are connected to the service, it is desirable to acquire the print job not by the terminal, but the printer.

As discussed above, in the anywhere printing function or the pull printing, the user operation processes, including an overlapped print document selection, increase, this leads to the longer occupation time for the operation unit of the printer. In the printing system consisting of the print service, the NFC equipped mobile terminal, and the printer, it is desirable that the printer itself receives the print job.

Here, the definitions of the terms will be augmented. "Job" or "print job" refers to a job of which print data acquired from the application and a print setting performed by a user are put together. Alternatively, "job" or "print job" refers to data by which the job (print data and print setting) is rendered, and is converted to a format appropriate to each printer. The converted job is generally provided using "Page Description Language" (PDL) or image data. "Job information" refers to a location of print data or a print setting, or an attribute.

"Pull job" refers to a job that is spooled according to an instruction for pull printing. "Push job" refers to a job that is spooled according to an instruction for push printing. Upon an issuance of a pull printing request from the printer, a job is downloaded and printed. "AWP job" refers to a job that is spooled according to an instruction for anywhere printing. A specific printer is not selected in the print instruction, but when a user issues a pull printing request via an arbitrary printer in the printing system, the AWP job is downloaded to the printer, and printed. The AWP job is a kind of the pull job.

First Embodiment

Configuration of Printing System

FIG. 1 is a diagram illustrating a configuration example of a printing system according to the present invention. The printing system includes a print server group 1 that is a server system, a mobile terminal 2 (hereinafter also represented as a terminal 2), and a printer 3. As shown in FIG. 1, the printing system may include a fixed type terminal 4 as well as the mobile terminal 2. The each device is connected via a network 5, and the network 5 is connected to an Internet 9. Also, each server included in the print server group 1 is connected via the network 5, and the network 5 is connected to the Internet 9. As illustrated, since the print server group 1 consists of a plurality of servers, the print server group is also referred to as a "server system". When referred to as "server system", the mobile terminal 2, the printer 3, and the fixed type terminal 4 are not included in the server system.

In the present embodiment, although the print server group 1 that is the server system is illustrated, there is not necessarily the plurality of servers, and single server may implement a print service 11 shown in FIG. 3 described below. Note that each device configuring the printing system is connectable with each other via the Internet 9, and can perform data communication. The mobile terminal 2 can select mobile communication 6 as a method for connecting to the Internet 9. Mobile communication 6 includes wireless communication and public line communication. In addition, the mobile terminal 2 and the printer 3 are capable of communicating through near field communication 7. By means of near field communication 7, the mobile terminal 2 and the printer 3 are connectable without the Internet 9. Also, a plurality of mobile terminals 2, printers 3, and fixed type terminals 4 may be included in the printing system.

A control method in the present embodiment is a control method for the information processing system shown in FIG. 1. Computer programs in the present embodiment cause a computer to execute the control method.

Hardware Configuration

Figure 2A:
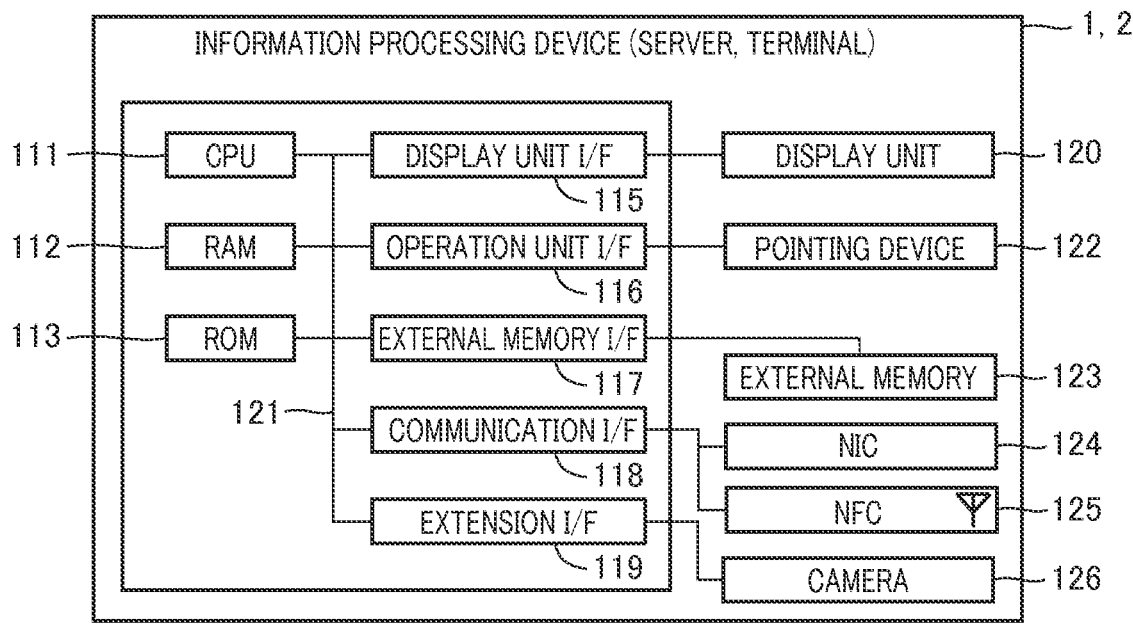
FIG. 2A and FIG. 2B are block diagrams illustrating an example of a hardware configuration of each device.
Figure 2B:
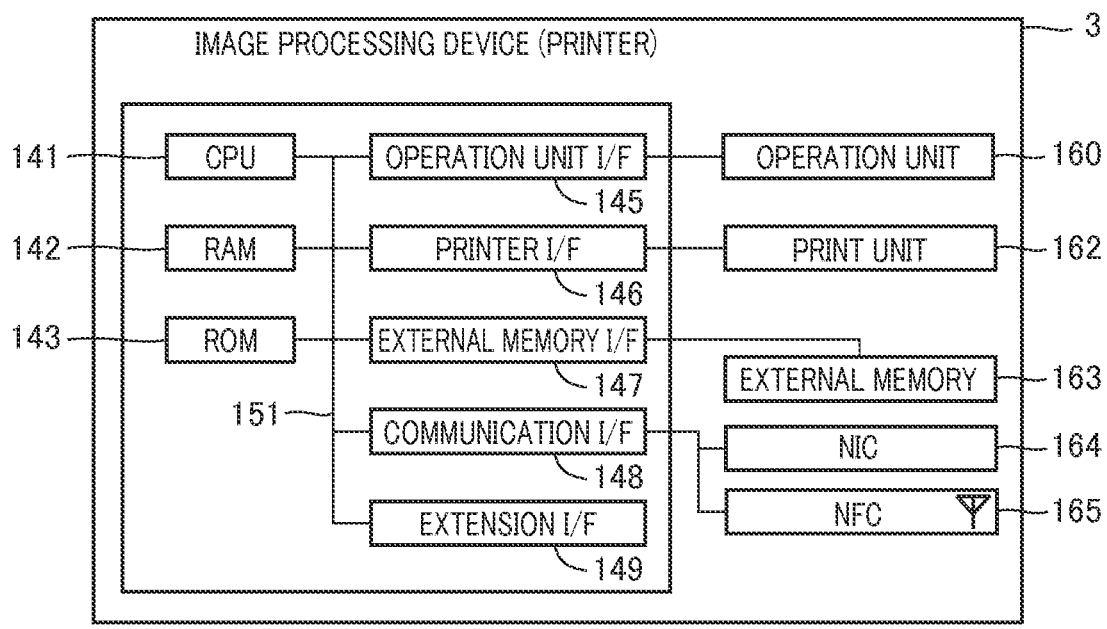

FIG. 2A and FIG. 2B are block diagrams illustrating an example of a hardware configuration of the information processing device and the printer. FIG. 2A is a block diagram representing an example of a hardware configuration of the print server group 1 and the mobile terminal 2 that functions as an information processing device. The information processing devices 1 and 2 include a CPU 111, a RAM 112, a ROM 113, a display unit I/F 115, an operation unit I/F 116, an external memory I/F 117, a communication I/F 118, and an extension I/F 119. The CPU is an abbreviation for "Central Processing Unit". The RAM is an abbreviation for "Random Access Memory". The ROM is an abbreviation for "Read. Only Memory". The HDD is an abbreviation for "Hard Disk Drive". The information processing devices 1 and 2 include a display unit 120, a pointing device 122, an external, memory 123, an NIC 124, an NFC 125, and a camera 126. The NIC is an abbreviation for "Network Interface Card".

The CPU 111 integrally controls the respective devices that are connected to a system bus 121 according to the programs stored in the ROM 113, which is a storage unit. The RAM 112 functions as a main memory and a working memory for the CPU 111. The ROM 113 stores various programs and data. The pointing device 122 may be a touch panel or a mouse, or a keyboard.

The display unit I/F 115 controls a screen display relative to the display unit 120. The operation unit I/F 116 controls an input from the pointing device 122. The external memory I/F 117 controls an access by, for example, a flash memory, an SSD (Solid State Disk) and the like to the external memory 123. The external memory 123 functions as a storage medium that is capable of saving or reading. An operating system (OS), a Web browser, and applications are stored in the external memory 123. The programs for the applications and the respective modules (software) stored in the external memory 123 are read into the RAM 112 as necessary, and executed by the CPU 111. In this manner, the CPU 111 realizes the functions of the applications or the respective modules (software).

The communication I/F 118 controls communication by the NIC 124 or the NFC 125. The NIC 121 is a connection I/F with the network. The NIC 124 allows the information processing devices 1 and 2 to connect to the networks 5, and 6 and controls data exchange between the devices. The configuration is not limited to the configuration shown in FIG. 2A, and the information processing devices 1 and 2 may control communication to a mobile line to thereby connect the network of a wireless base station. The NFC 125 is a connection I/F that functions as a non-contact type of near field communication unit. For example, the NFC 125 allows a connection between the terminal 2 and the printer 3, and controls reading/writing of an IC tag and data exchange through a wireless communication. The camera 126 has an image capturing function. The process described in the present embodiment is realized by loading the programs stored in the external memory 123 into the RAM 112, and executing the programs by the CPU 111. Note that other than the external memory 123, the programs may also be stored in the RAM 112 or the ROM 113. Also, the print server group 1 does not need to include the units 120 to 126 shown in FIG. 2A.

FIG. 2B is a block diagram illustrating an example of a hardware configuration of the printer 3 that functions as an image processing device in the present embodiment. The printer 3 includes a CPU 141, a RAM 142, a ROM 143, an operation unit I/F 145, a printer I/F 146, an external memory I/F 147, a communication I/F 148, and an extension I/F 149. The printer 3 also includes an operation unit 160, a print unit 162, an external memory 163, an NIC 164, and an NFC 165.

The CPU 141 controls overall operation by the printer 3. The CPU 141 integrally controls the respective units that are connected to a system bus 151 according to programs stored in the ROM 143. The RAM 142 functions as a main memory and a working area as well as being used as an input information expansion area and an environment data storing area. Also, the RAM 142 includes an NVRAM (Non-volatile RAM) and configured so that memory capacity is extended by means of an optional RAM that is connected to an expanded port (not shown). The ROM 143 stores various fonts, a control program executed by the CPU 141, various data, and the like.

The operation unit I/F 145 controls an interface with the operation unit 160 for performing various settings for the printer 3. The printer I/F 146 controls an interface with the print unit 162 that is a printer engine. The external memory I/F 147 controls access to the external memory 123. The communication I/F 148 controls communication by the NIC 164 or the NFC 165.

The NIC 164 is a connection I/F with the network 5, and controls data exchanges between the print server group 1, the fixed type terminal 4, and the mobile terminal 2. The NFC 165 is a connection I/F for the near field communication, allows a connection through the NFC, and controls reading/writing of an IC tag and a data exchange. The communication I/F 148 includes an implementation such as a Web service protocol appropriate to an environment for the implementation. Access to the external memory 163 is controlled by the external memory I/F 147, and includes for example, a flash memory, an SSD, and the like. The CPU 141 reads the programs stored in the external memory 163, the ROM 143, or the like into the RAM 142 as necessary, and executes the programs to thereby realize the functions of the printer 3.

The processes described in the present embodiment are realized by loading the programs stored in the external memory 163 into the RAM 142, and executing the programs by the CPU 141. Note that other than the external memory 163, the programs may be stored in the RAM 142 or ROM 143.

Software Configuration

FIG. 3 is a block diagram illustrating a software configuration of the printing system. The respective software configuring units shown in FIG. 3 are realized by loading programs stored in each ROM, and executing the programs by each CPU provided in the respective devices shown in FIG. 2A and FIG. 2B. Similarly, the respective software configuring units are realized by the following processing. That is, each CPU provided in the respective devices loads the programs stored in the external memory into the RAM, and executes the programs to thereby realize the functions of the respective software configuring units.

In the following, a description will be given of a software configuration of the print server group 1 that functions as a print service device. The print service 11 is, for example, a cloud print service. The print service 11 includes a Web application 30, a control unit 31, an authentication unit 32, a print unit 33, a communication unit 34, and a Web communication unit 35. The printer 3 cooperates with the print service 11 so as to extend its functions. Specifically, the printer 3 in the present embodiment can print data on the network without a driver.

The Web application 30 is an application that provides a Web service included in the print service 11. The print service 11 returns, to the Web browser of the mobile terminal 2, an application in which documents or a script are dynamically generated in response to a request. The print service 11 uses the Web communication unit 35 when connecting to the mobile terminal 2, the printer 3, and an external device (not shown).

The control unit 31 controls functions of the print service 11, including the authentication unit 32, the print unit 33, the communication unit 34, and the Web communication unit 35. The respective processing units realize their functions according to instructions by the control unit 31. The authentication unit 32 manages a user account, a Web application, and authentication information for the mobile terminal and the printer. The authentication unit 32 authenticates the mobile terminal, or the printer that accesses the print service 11 based on the managed information. That is, the authentication unit 32 transmits, to a target that accesses the print service 11, an authentication screen for causing the target to input, for example, a user account and a password. However, in the present embodiment, a configuration is applied where the authentication screen is not transmitted when the printer 3 accesses the print service 11 and acquires document data, specifically, print data. This reason is for this is to reduce the burden for authentication processing by a user. For acquiring print data by the printer 3 without the authentication burden, the user requests the authentication unit 32 to issue printer authentication information and saves the issued printer authentication information in the printer 3 by operating the printer in advance. In this manner, upon acquiring print data from the print service 11, the printer 3 transmits the saved printer authentication information to the print service 11 so that the print service 11 can authenticate the printer 3 without requesting an input for authentication information. Similarly, the print service 11 can authenticate the mobile terminal. On the other hand, the authentication unit 32 requests an input for authentication information to a user when accessed through, for example, the Web browser of the mobile terminal 2.

The print unit 33 includes an AWP 331, a UI providing unit 332, and a print managing unit 333. The UI providing unit 332 of the print unit 33 transmits a list of registered printers to the terminal 2 in response to a print instruction by a user. The printer list is a printer selection screen (not shown) for selecting, by a user, a printer that executes printing. Note that data related to the printers retained by the print service 11 is invisible to the user. The user figures out the registered printer through the printer list. In the present embodiment, all printers visible for the user are called "printer". On the other hand, a data group that is invisible for the user and is used when the service provided by the print service 11 cooperates with the printer is called "printer object". The aforementioned printer authentication information is also included in the data group that configures a printer object.

The print managing unit 333 acquires data from an external device (not shown) such as the terminal 2, or 4 via the network. Then, in response to a selection, by a user, of a printer that prints the data on the printer selection screen, the print managing unit 333 generates a print job corresponding to the data, and manages the generated print job by associating it with the selected printer. Also, the print managing unit 333 has a function for managing not only the print job but also the printer object. The print unit 33 has an AWP 331 as the printer object. The AWP331 is a printer object that functions as an anywhere printing, and has a function for temporarily storing a job for the AWP. When the user provides an instruction for printing without specifying a printer that executes printing, the print managing unit 333 generates a print job corresponding to data to be printed, and manages the generated print job by associating it with the AWP 331. Also, when an authentication based on the print authentication information has been successfully made by the authentication unit 32, the print managing unit 333 passes the print job that is managed in the print managing unit 333 or is temporarily stored in the AWP 331 to the communication unit 34.

The communication unit 34 communicates with the printer 3 registered with the print service 11, to thereby transmit the print job that is managed in the print managing unit 333 or temporarily snored in the AWP 331 to the printer 3. The communication unit 34 also has a function for storing information for communicating with the registered printer (for example, a printer name, and an IP address, capabilities of the printer).

A description will be given of a software configuration of the mobile terminal 2. The mobile terminal 2 includes a Web browser 11 and an OS 40. The Web browser 41 has a drive unit 411. In the mobile terminal 2, the drive unit 411 executes a script and the like included in a Web document or an application. The OS 40 of the mobile terminal 2 has a communication unit 401. The communication unit 401 controls communication by the mobile terminal 2, and exchanges information with the print service 11 or the printer 3. The communication unit 401 controls a plurality of communication methods such as the mobile communication 6 to the network 5, the NFC communication 7, or the like. The communication unit 401 also has a function for storing information necessary for the communication. When communicating with the Web communication units 35 or 50 of the print service 11 or the printer 3, the mobile terminal 2 uses the Web browser 41 as a Web client.

Next, a description will be given of a software configuration of the printer 3 that functions as an image processing device. The printer 3 includes a Web communication unit 50, a control unit 51, a print unit 51, and a communication unit 53.

The control unit 51 of the printer 3 is loaded for controlling printing and communication processing. The control unit 51 controls a communication function of the communication unit 53 via the communication I/F 148, and a print function of the print unit 52 via the printer I/F 145. In order for the print service 11 and the printer 3 to cooperate, the communication unit 34 of the print service 11 and the communication unit 53 of the printer 3 communicate with each other in a specific communication protocol so as to transmit/receive the print job. The printer 3 transmits the pre-issued printer authentication information to the print service 11 via the communication unit 53. Upon receiving the printer authentication information via the communication unit 34, the authentication unit 32 of the print service 11 performs authentication based on the printer authentication information. When the authentication has been successfully made, the printer 3 can receive the print job. The printer authentication information is also saved in the communication unit 53. When a Web connection to the print service 11 or the mobile terminal 2 is performed from the printer 3, the Web communication unit 50 is used.

Appearance of Hardware

Figure 4A:
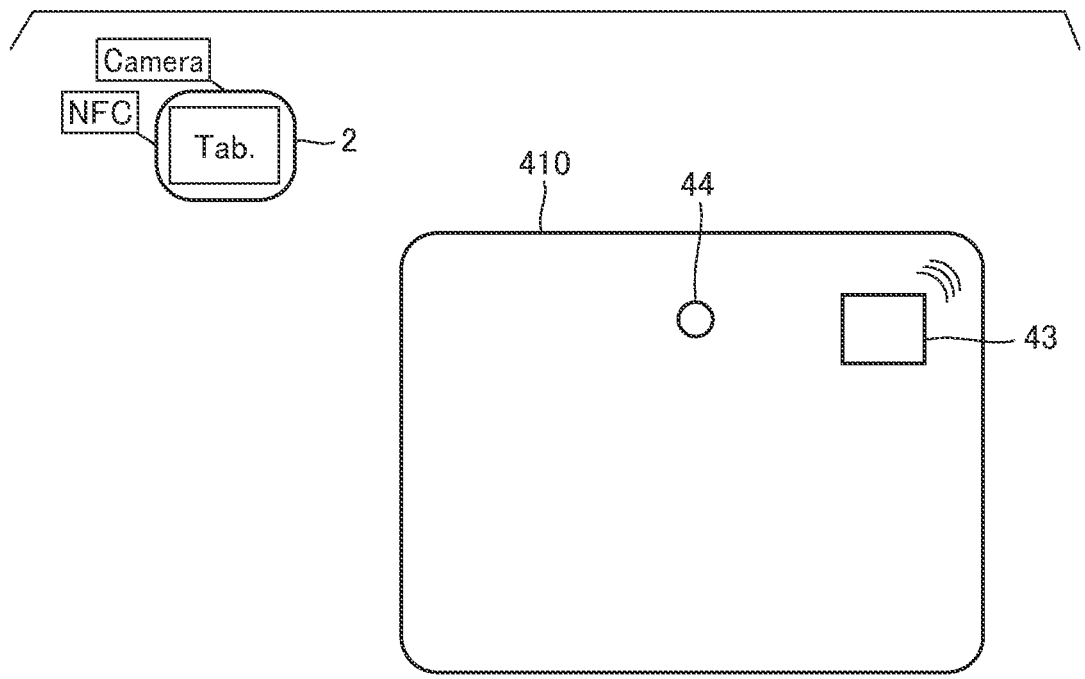
FIG. 4A and FIG. 4B illustrate a schematic of the hardware appearance of a terminal.
Figure 4B:
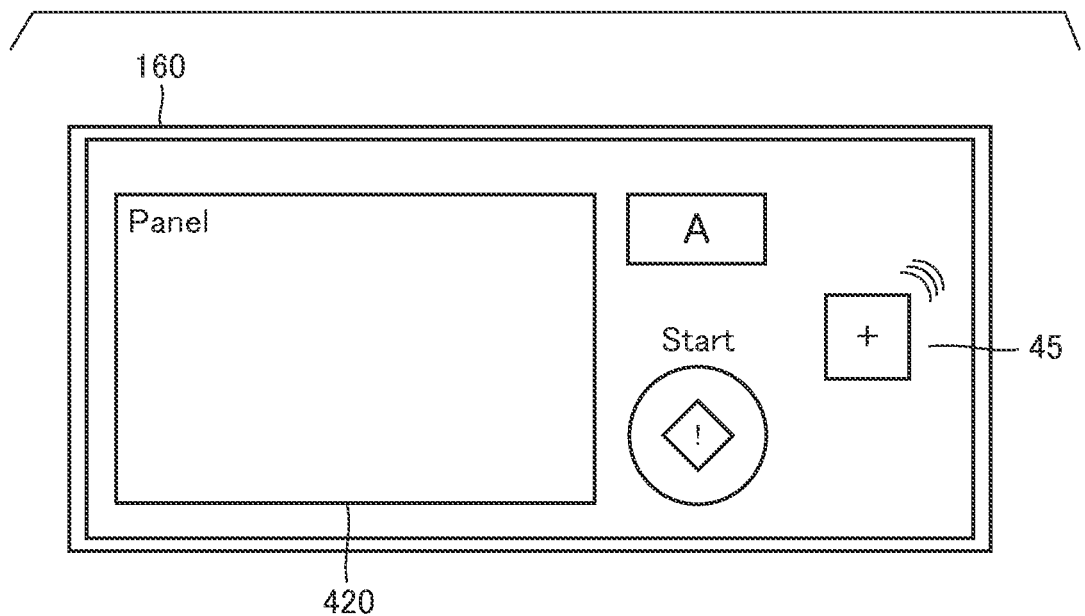

A description will be given of an example of an appearance of the terminal 2 and the printer 3 with reference to FIG. 4A and FIG. 4B. FIG. 4A is an example of an appearance of the mobile terminal 2. As shown in a left side of FIG. 4A, the mobile terminal 2 has an NEC function and a camera function. Reference numeral 411 shown on the right side of FIG. 4A indicates a back view of the mobile terminal 2, and an NFC touch point 43 and a camera 44 are arranged. FIG. 4B is an example of an appearance of the printer 3. The printer 3 according to the present embodiment has an NFC function. An operation panel 420 and an NFC touch point 45 are arranged on the operation unit 160 of the printer 3.

Print Method in Printing System

Figure 5A:
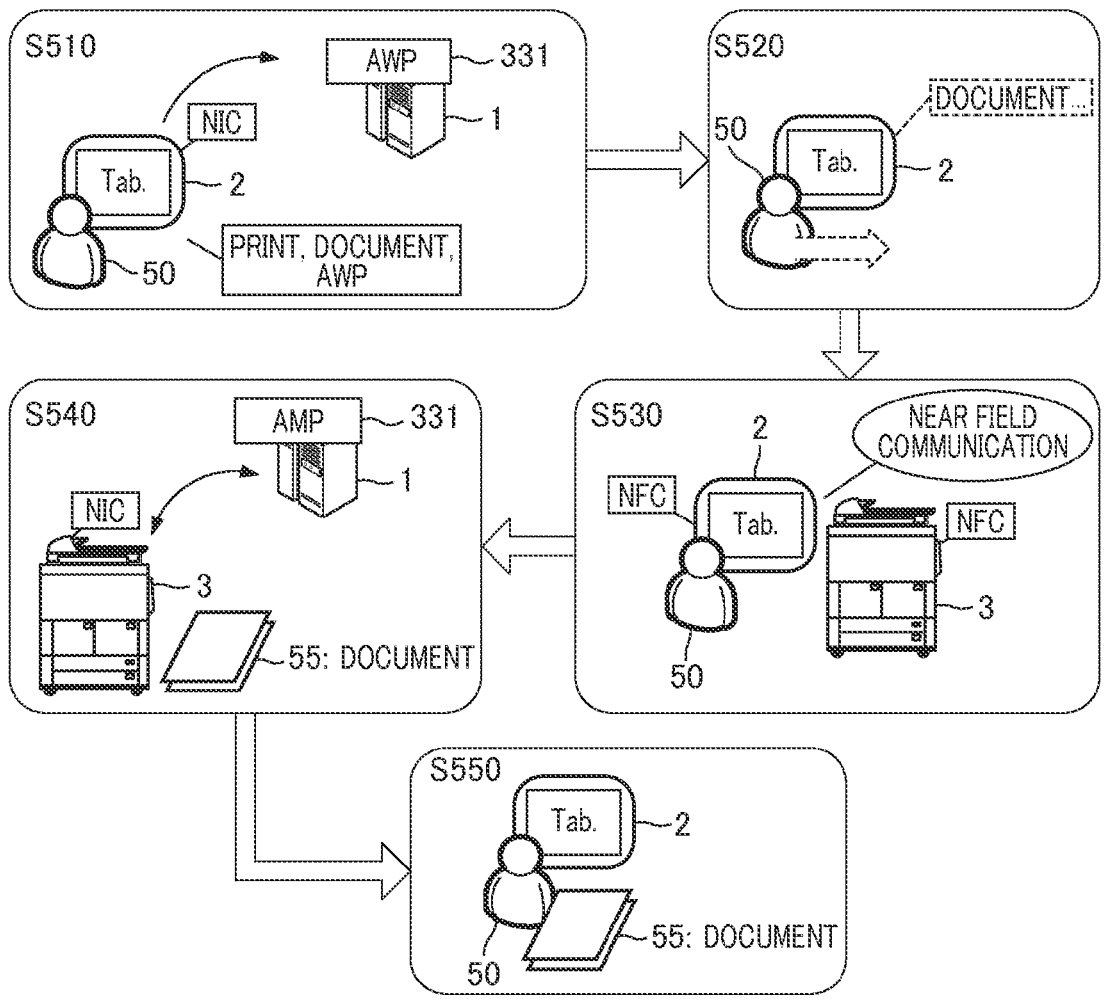
FIG. 5A illustrates an outline of user actions for printing by using an anywhere printing function.

A description will be given of an outline of user actions for printing with the anywhere printing function in the present embodiment with reference to FIG. 5A and FIG. 5B. FIG. 5A is an outline of a print method in the present embodiment. First, a user 50 selects a print instruction on the screen provided on the mobile terminal 2, selects a document to be printed, and provides an instruction for printing considering a printer as an AWP in S510. At this time, the print instruction is transmitted from the mobile terminal 2 to the AWP 331 provided in the print service 11. In S520, the user 50 moves near a printer that actually executes printing while having the mobile terminal 2. At this time, the mobile terminal 2 is capable of pre-processing required for printing of the document selected in S510. For example, the document selected in S510 is a target for printing in the case of a default setting. However, it is contemplated that the user 50 provides an instruction for printing additional documents that are temporarily stored in the AWP 331 during transfer to the printer. At this time, the terminal 2 can acquire all of jobs that are temporarily stored in the AWP 331 as pre-processing.

Note that the user 50 can also change the print setting of the document for which the user has provided the instruction for printing during transfer to the printer. Unlike the case of push printing, since the job is temporarily stored in the AWP 331, the print setting of the temporarily stored job can be changed. The job of which the print setting has been changed is not printed but again temporarily stored in the AWP 331. The aforementioned print setting change may be implemented with respect to a job (for example, a document "bb" which is described below with reference to FIG. 8) that has been already temporarily stored. Thus, when the user 50 actually causes the printer to print the document, it is advantageous to reconfigure the print setting of the job that has been temporarily stored in the AWP 331 for a long time.

In S530, the user 50 comes closer to the printer 3. The user 50 puts the NEC touch point 43 provided in the mobile terminal 2 closer to the NFC touch point 45 provided in the printer 3. At this time, the print instruction and document information to be printed are passed from the mobile terminal 2 to the printer 3 through the NFC without a selection of the printer 3 by the user.

In S540, the printer 3 transmits the document information to be printed through the network to the print unit 33 of the print service 11 via the communication unit 53. The print unit 33 that has received the document information to be printed transmits the print job that is temporarily stored in the AWP 331 to the printer via the communication unit 34. Then, the printer 3 acquires the print job. In S550, the printer 3 prints the document 55. Then, the user 50 having the mobile terminal 2 leaves the printer 3. At this time, the mobile terminal 2 may perform post-processing required for document printing (such as a display of a print completion result on the screen of the terminal 2).

Figure 5B:
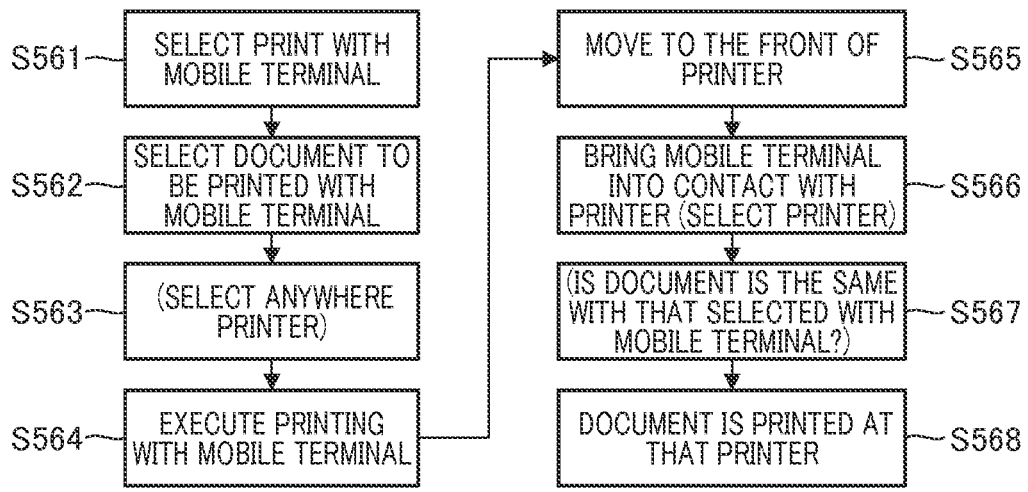
FIG. 5B illustrates a flow of print, processing by a user by using an anywhere printing function.

FIG. 5B indicates an outline of a flow of operation processes by a user with the anywhere printing function in the present embodiment. In S561, a user "selects a print instruction" with the mobile terminal 2. In S562, the user "selects a document" to be printed with the mobile terminal 2. In S563, if a printer that executes printing is set to the AWP 331 in advance, no operation to the mobile terminal 2 is required. If a printer other than the AWP 331 is set in advance, the user reselects the AWP 331. Then, the user 50 "executes printing" with the mobile terminal 2 in S564. In S565, the user "moves in front of the printer 3" That executes printing.

In S566, the user brings the mobile terminal 2 "into contact with the NFC touch point" of the printer 3. The action in S566 has the same meaning as selecting the printer with the operation unit. In S567, since the document selected in S562 is automatically selected, no selection operation is required here. That is, when moving to the printer location, the user is not required to reselect a printer that executes printing on the operation panel. In S568, the document selected with the mobile terminal 2 is "printed by the printer 3".

The pull printing in the present embodiment has a feature of which the number of operation processes is the same with that of the push printing. As described with reference to FIG. 5, the document selection operation by a user for printing is performed once. Also, the printer selection operation by an NFC touch is performed once, and the operation unit of the printer is not used. Therefore, the user does not occupy the printer. In other words, the present invention according to the present embodiment avoids overlapped print document selection and the operation of the printer to thereby enhance the advantageous for printing.

Example of Job Screen Display

Figure 6:
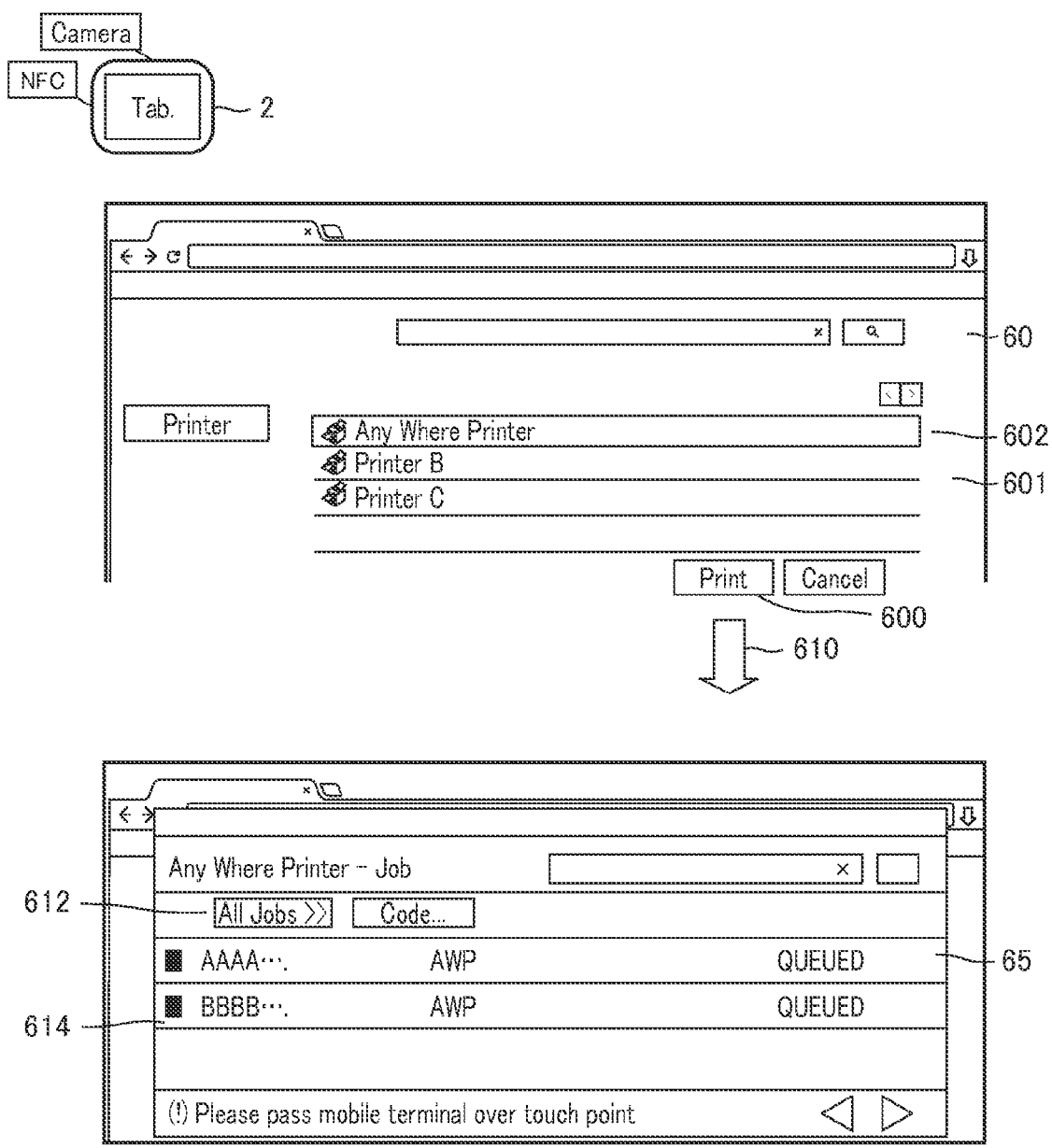
FIG. 6 illustrates an example of a print job screen display by a printing system.

A description will be given of a screen example of the print service 11 displayed on the mobile terminal 2 with reference to FIG. 6 and FIG. 7. When accessing a specific URL for the print service 11 by using the Web browser of the mobile terminal 2, the user can view a screen provided by the print service 11. FIG. 6 and FIG. 7 show display screens when the Web application 30 of the print service 11 is used with the Web browse 41 of the mobile terminal 2.

First, a description will be given of a print screen 60 displayed on the screen of the mobile terminal 2. The print screen 60 includes a printer list 601. The printer selected by a user in the printer list 601 executes printing. In this example, the AWP 331 of the print service 11 is displayed on the printer list 601 as an "Anywhere Printer" 602. When the user presses the "print" button 600 on the print screen 60 of the print service 11, the screen transits to (610), and a job list screen 65 is displayed on the screen of the mobile terminal 2. During the screen transition (610), a display icon representing processing-in-progress may be displayed.

The job list screen 65 is displayed on the screen of the mobile terminal 2 in a floating window. A job list of the document selected for this print execution is displayed on the job list screen 65. An "All Jobs >>" button 612 is arranged on the job list screen 65. When a user presses the "All Jobs >>" button 612, the display of the job list is switched to a display of a job list for all jobs stored in the AWP. For example, in the case where a document selected by a user at this time is a document "aa", only the document "aa" is displayed on the job list screen 65. When the user presses the "All Jobs >>" button 612 in this state, a job of a document "bb" is added to the job list screen 65 and displayed. A selection marker 614 is arranged in the respective jobs displayed in the list. When the user presses the selection marker 614, the user can switch between jobs that are a print target or not a print target.

As described above, the job list screen 65 displays the job list of the document selected for this print execution. That is, the job list screen 65 displays a result of the document selection, and thus, a selection operation on this screen is not essential. Hence, the "All Jobs >>" button 612 is operated when the one or more jobs stored in the AWP 331 are added. Also, the selection marker 614 is operated in order to exclude the job from the job target or selecting the job target from among the jobs. Also, the user can close the floating-displayed job list screen 65 by selecting an area other than this area. If an instruction operation by the user is required with respect to the near field communication with the printer accompanied by the NFC touch, a "Send" button may be arranged on the job list screen 65.

The job list screen 65 and the screen transition (610) described with reference to FIG. 6 are examples suitable for the mobile terminal 2 on which the application is displayed in a single window, and the touch panel is operated.

Second Example of Job Screen Display

A description will be given of another screen example of the print service 11 displayed on the mobile terminal 2 with reference to FIG. 7. The print screen 60 of the mobile terminal 2 is the same as that shown in FIG. 6. When the user presses the "print" button 600 on the print screen 60 of the print service 11, printing is executed.

When the "print" button 600 is pressed, a screen transits to (710), and a job list screen 67 is displayed on the mobile terminal 2. Note that an icon representing processing-in-progress may be displayed during the screen transition (710). The job list screen 67 is displayed on the mobile terminal 2 in a pop up window. The content indicated on the job list screen 67 is the same as that on the job list screen 65. The job list screen 67 and the screen transition (710) described with reference to FIG. 7 is an example suitable for the mobile terminal 2 on which the application is displayed in a multi window and operated for each window. If there is already the job list screen, the job list screens 65 and 67 may be applied in the screen area. Also, the job list screens 65 and 67 display the job lists selected in the current print execution.

Operation Outline of a Printing System

A description will be given of an operation outline of the printing system according to the present invention that executes printing by using the anywhere printing function with reference to FIG. 8. A user selects a document for printing on the mobile terminal 2 that is connected to the print service 11 and equipped with the NFC and the camera, and presses the print button. A print request is made from the mobile terminal 2 to the print unit 33 of the print service 11 via the communication unit 34 (S811).

The print managing unit 333 of the print service 11 stores an AWP job in the AWP331. For example, since the user has selected the document "aa" (81), the document "aa" that has been requested to the print service 11 is displayed on the job list screen 65 of the mobile terminal 2. For example, the document "aa" that is currently entered from the mobile terminal 2 and the AWP job of the document "bb" that has been previously entered (82) are stored in the AWP 331. In S812, the mobile terminal 2 acquires a job information list of the AWP job from the print service 11. In this example, when the user presses the "All Jobs >>" button 612 as described with reference to FIG. 6, job information including the documents "aa" and "bb" is displayed on the screen of the terminal 2, as shown in reference numeral 83. Naturally, a configuration may be applied in which the mobile terminal 2 acquires only job information of the document "aa" from the print service 11 in S812.

In S813, the mobile, terminal 2 compares the request information 81 requested in S811 with the job information 82 acquired in S812. As this a result of this comparison, the terminal 2 treats the document "aa" as a print target from the job information 82, and forms retrieved job information 84. The job identification and selection by the printing system in S811 and S812 are treated as the processing 810. The printing system can perform the processing 810 while the user having the mobile terminal 2 moves to the front of the printer 3 that executes printing.

The user having the mobile terminal 2 has moved to the front of the printer 3 that executes printing. The user brings the mobile terminal 2 into contact with the NFC touch point of the printer 3. The mobile terminal 2 passes a print instruction and the retrieved job information 84 to the printer 3 through the near field communication (S814). In this example, the mobile terminal 2 passes the retrieved job information 84 of the document "aa" to be printed to the printer. The transfer of the job information by the terminal 2 in S814 is treated as the processing 820.

The printer 3 has received the print instruction and the retrieved job information 84 from the terminal 2 through the NFC. The printer 3 acquires the AWP job for the document "aa" from the AWP 331 of the print service 11 based on the received information to thereby execute printing (S815). In this example, the printer 3 acquires the AWP job for the document "aa" to thereby print a document 55. The job acquisition and printing by the printing system in S815 is treated as the processing 830.

The processing 810 is the print document identification and selection by the mobile terminal 2. The processing 820 is transmission/reception processing for the print instruction with the printer selection and the job information through the near field communication between the mobile terminal 2 and the printer 3. The processing 830 is the pull printing processing by the printer in response to the instruction by the terminal 2. The respective flowcharts of the processing 810, 820, and 830 are described below.

Data Outline

A description will be given of a data outline held by the printing system with reference to FIG. 9. The information 81 to 83 described with reference to FIG. 8 are lists having three types of supplemental information. Data held by the printing system includes a request list (first list) 91, a job list (second list) 92 and a retrieved list (third list) 93.

The request list 91 is passed from the terminal 2 to the print service 11 in S811. The request list 91 is request information for requesting the print service 11 to print a document, and information to be stored in the print service 11. The request list 91 is a list for requesting a job generation for the document. Here, the request list 91 includes "document request information" (911) of the document "aa". The "document request information" (911) includes a title, a document URI, and a tag as a data item. The tag is tag information given to the document to be requested. For example, this can be supplemented by document request unit or issuance location information. Since, the Web application 30 of the print service 11 is used, the print service 11 sets data items included in the document request information.

Figure 8:
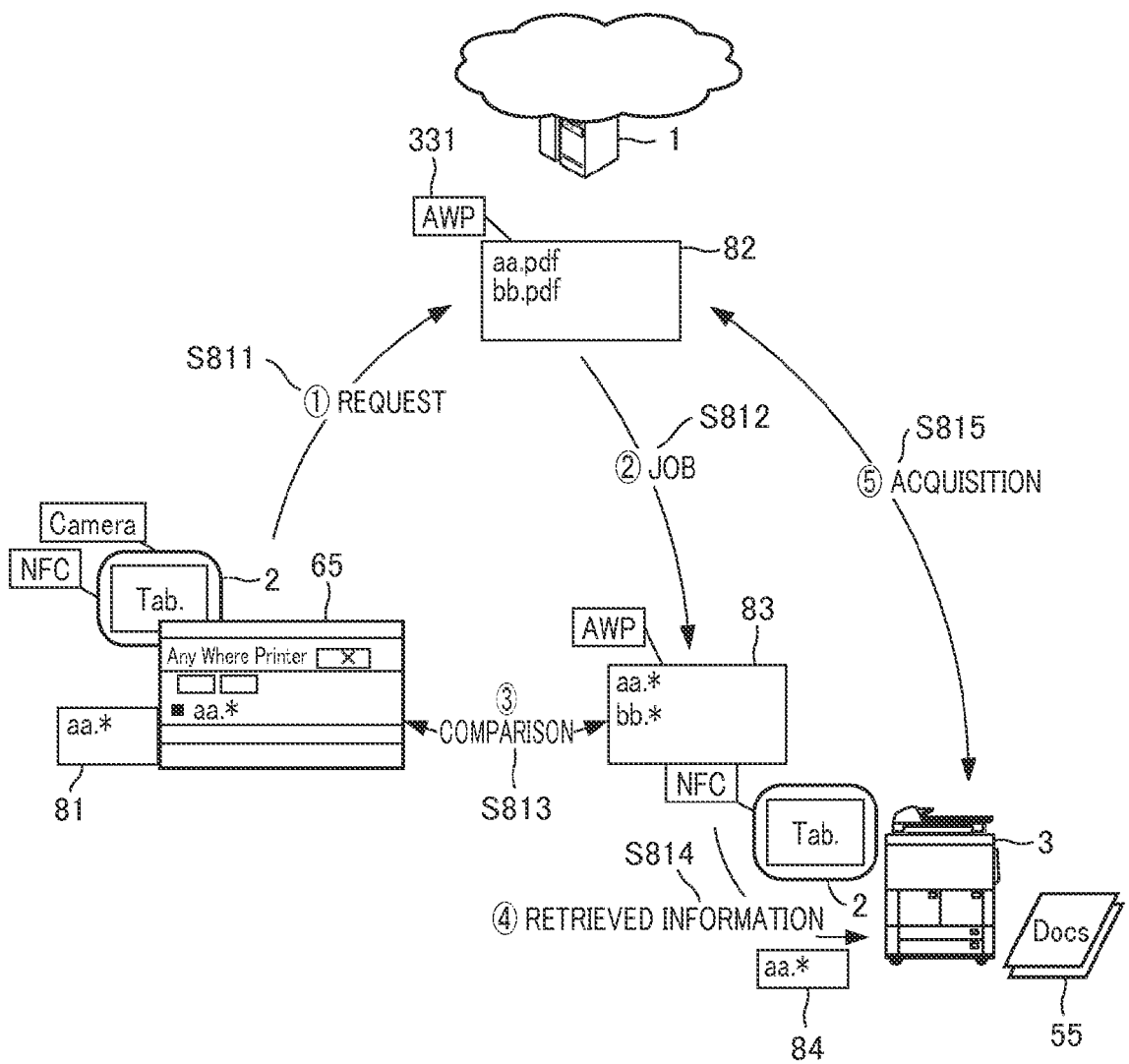
FIG. 8 illustrates an outline of actions by a printing system for printing by using an anywhere printing function.
Figure 9:
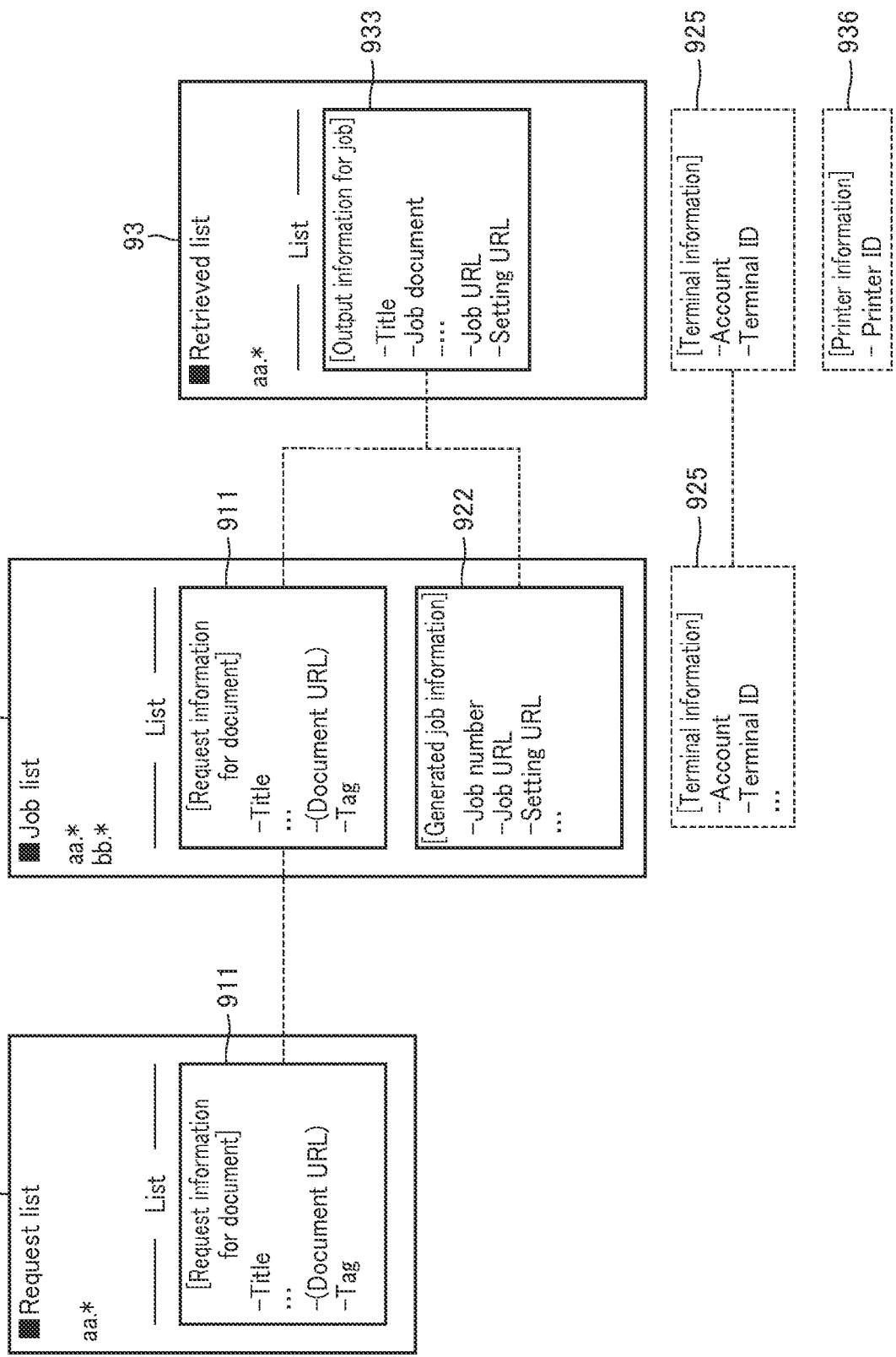
FIG. 9 illustrates a data configuration held by a printing system.

The job list 92 is passed from the print service 11 to the terminal 2 in S812 of FIG. 8. The job list 92 is information of the AWP job that has been stored in the AWP 331 of the print service 11. The print service 11 that has received the request for the document from the terminal 2 generates the AWP job for the document. Information of the generated AWP job is "generated job information" 922. That is, the job list 92 includes the "document request information" (911) and the "generated job information" (922). The "document request information" (911) in the job list 92 is the same as that in the request list 91. The "generated job information" (922) functions as storage information indicating the storage location of the generated print job. The "generated job information" (922) includes a job number, a job URL, and a setting URL as a data item. The "document request information" (911) and the "generated job information" (922) is listed for each job, that is, for each document "aa", "bb" in this example.

Also, the job list 92 can be supplemented with the "terminal information" 925 of the mobile terminal 2. The "terminal information" 925 includes, for example, an account, a terminal ID and the like as data items. The "terminal information" 925 may be supplemented when the print service 11 generates the information for the AWP job, or the terminal 2 that has received the job list 92 may add it. Preferably, each device retains the job list 92 including the "terminal information" 925 and manages the document to be printed by associating it with the terminal 2.

The retrieved list 93 is information about the AWP job retrieved by the terminal 2 in S814 of FIG. 8. The retrieved list 93 is a list in which request information that is required when the printer 3 acquires the AWP job from the print service 11 is organized. The retrieved list 93 is a list of "job output information" (933). Here, "job output information" (933) of the document "aa" is listed. The "job output information" (933) is formed with the "document request information" (911) and the "generated job information" (922) of the document "aa". The "job output information" (933) includes a title, a job number, a job URL, and a setting URL as a data item.

The printer 3 that has received the retrieved list 93 from the mobile terminal 2 can supplement the retrieved list 93 with the "terminal information" 925 and "printer information" 936. The mobile terminal 2 may add the "terminal information" 925 to the retrieved list 93. The "printer information" 936 includes a printer ID and the like as a data item.

The aforementioned outline will now be summarized. The request list 91 is used for requesting the print service 11 to print the document. The job list 92 is used for acquiring the job list stored in the AWP of the print service 11. The retrieved list 93 is used for acquiring and printing, by the printer 3, the AWP job stored in the print service 11. The "terminal information" 925 or the "printer information" 936 can be supplemented for the post-processing, such as a print completion notification or an error notification. Note that although "list" is represented for explaining a data configuration, data may be configured in any list format data with data having a document structure.

Flowchart Corresponding to the Job Identification and Selection Processing 810

Figure 10:
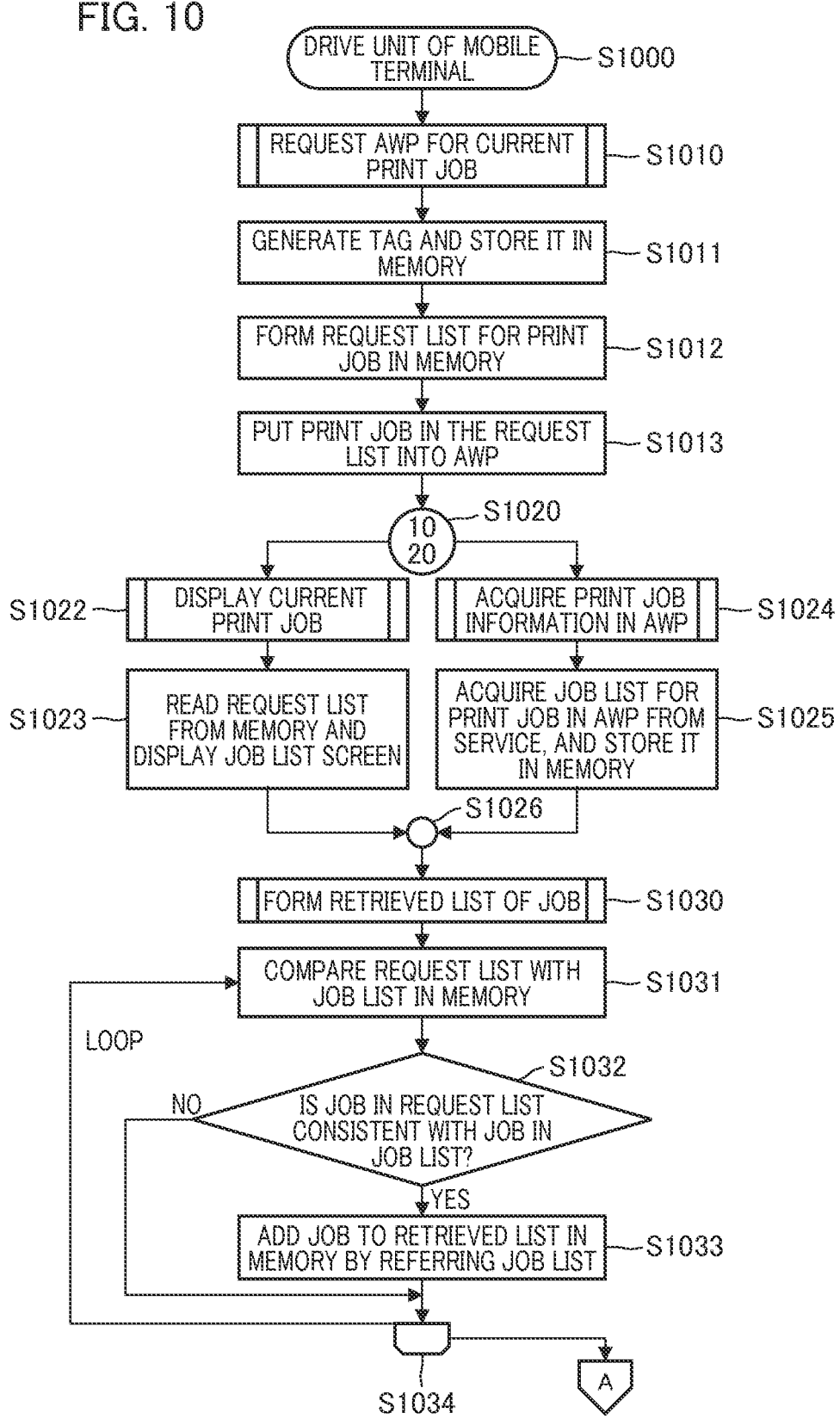
FIG. 10 illustrates a flowchart of job identification and selection processing.
Figure 11:
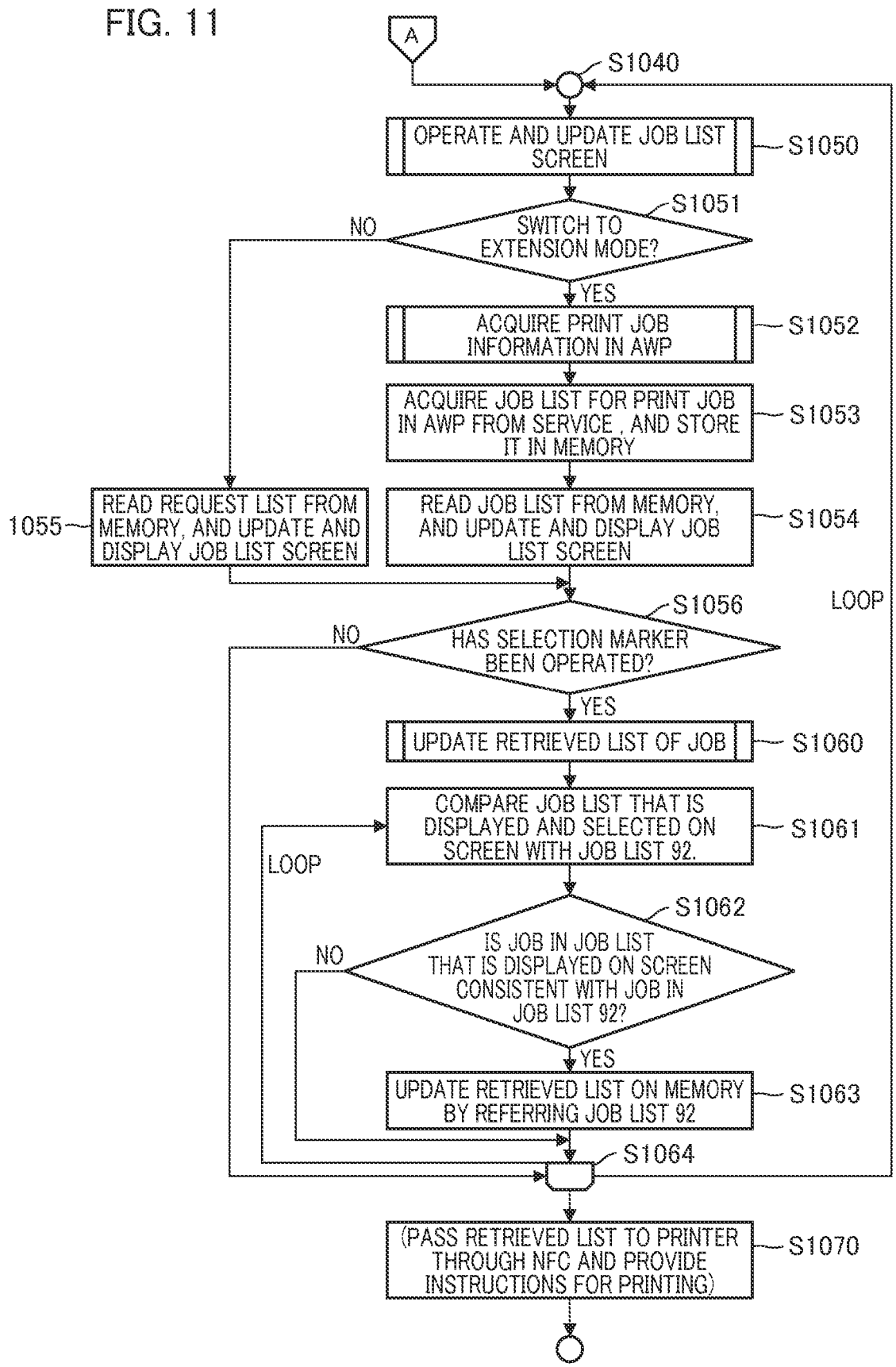
FIG. 11 illustrates a subsequent flowchart of the job identification and selection processing.

FIG. 10 and FIG. 11 are flowcharts executed by the drive unit 411 of the mobile terminal 2, and correspond to the processing 810. The Web application 30 of the print service 11 is executed by the drive unit 411 of the mobile terminal 2. The drive unit 411 selects the job stored from the mobile terminal 2 to the AWP331 of the print service 11 of AWP331.

In S1010, the drive unit 411 starts, to the print service 11, the request processing for the print job (the current print job) selected in S811 of FIG. 8. In S1011, the drive unit 411 generates and stores a tag in the external memory 163, the ROM 143 or the like. The tag is information for identifying the current print job later, and formed by, for example, information that is a request source and document information for each request unit. In S1012, the drive unit 411 forms and stores the request list 91 for the print job in the memory. In S1013, the drive unit 411 puts the print job in the request list into the print managing unit 333 of the print service 11. In S1020, the drive unit 411 continues processing, and subsequent processing is treated as the processing "1020".

In S1022, the drive unit 411 starts the current print job displaying processing. In S1023, the drive unit 411 reads the request list 91 from the memory to thereby display the job list screen on the Web browser 41. Here, the job screen for the document "aa" is displayed on the job list screen. In S1024, the drive unit 411 starts the print job information acquiring processing for the document "aa" that is stored in the AWP 331, that is, the job list acquiring processing. In S1025, the drive unit 411 acquires, from the print service 11, the job list for the print job of the document "aa" that is stored in the AWP 331, and stores the job list in the memory. The display processing in S1022 may be performed prior to or after the acquiring processing in S1024, or the processing in S1022 and S1024 may be performed at the same time.

In S1030, the drive unit 411 starts the retrieved list 93 forming processing for the job for which the instruction has been provided to printer 3. In S1031, the drive unit 411 compares, in the memory, the request list 91 stored in the memory with the received job list. In S1032, when the drive unit 411 determines that the "document request information" 911 described in the request list 91 is consistent with the "document request information" 911 described in the job list 92, the processing advances to S1033, and otherwise the processing advances to S1034. In S1033, the drive unit 411 retrieves job information by referring to the job list 92, and adds the job information to the retrieved list 93. In S1034, the drive unit 411 repeats the processing of S1031 to S1034 until the comparison is completed.

When the comparison has been completed, the processing advances to S1050 of FIG. 11, the drive unit 411 starts the job list screen operation processing and the updating processing. In S1051, when the drive unit 411 switches the mode to the extension mode, the processing advances to S1052, otherwise the processing advances to S1055. In other words, when the user presses the "All Jobs >>" button 612 described with reference so FIG. 6, the mode is switched to the extension mode. In S1052, the drive unit 411 starts the information acquiring processing of the print job that is temporarily stored in the AWP 331. In S1053, the drive unit 411 acquires, from the print service 11, the job list 92 for all print jobs that are temporarily stored in the AWP 331, and stores them in the memory. In S1054, the drive unit 411 reads the job list 92 from the memory, and updates and displays the job list screen on the Web browser 41. In S1055, the drive unit 411 reads the request list from the memory, and updates and displays the job list screen.

In S1057, when the selection marker is operated, the processing advances to S1060, otherwise the processing advances to S1064. In S1060, the drive unit 411 starts the retrieved job list updating processing. In S1061, the drive unit 411 compares, in the memory, the job list that is displayed and selected on the screen with the job list 92. In S1062, when the drive unit 411 determines that there is a job corresponding to the job selected by the operation of the selection marker, the processing advances to S1063, and otherwise the processing advances to S1064.

In S1063, the drive unit 411 updates the retrieved list 93 on the memory by referring to the job list 92. In S1064, the drive unit 411 repeats the processing S1061 to S1064 until the comparison is completed. When the comparison has been completed, the drive unit 411 repeats the processing from S1040 in response to the user operation until the job list screen is closed. However, when the job selection of the current print job is changed, the processing from S1040 to S1064 is executed as described above. In S1070, the drive unit 411 passes the retrieved list 93 to the printer 3 through the NFC, and provides an instruction for printing.

The flowchart has been described in which the drive unit 411 identifies and selects the job for which the print instruction has been made from the mobile terminal 2 to the AWP 331 of the print service 11. If the Web application 30 of the print service 11 employs the processing 810, the document selection when printing and the subsequent document selection/change are controlled by the drive unit 411. When the user instructs, from the mobile terminal, the printer to execute printing by using the anywhere printing function, the processing according to the present flowchart enables the printer to execute printing without a user operation to the printer.

In the aforementioned processing, a configuration is employed where the print jobs that are temporarily stored in the AWP 331 are acquired when the user selects to switch the mode to the extension mode in S1051. However, the configuration is not limited thereto. The terminal 2 may start the processing for acquiring the list for all jobs that are temporarily stored in the AWP 331 in S1024.

Flowchart Corresponding to Job Information Transferring Processing 820

Figure 12:
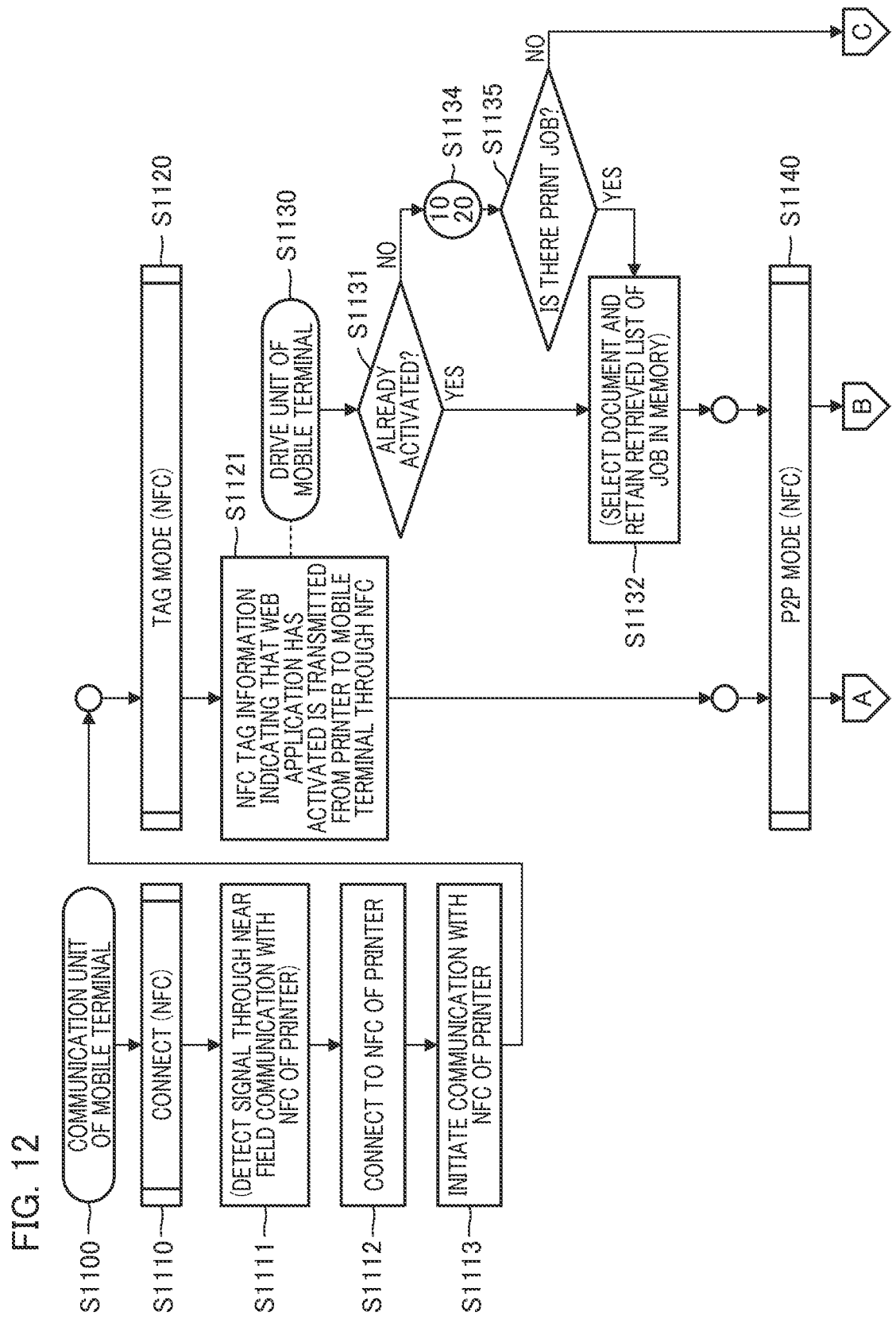
FIG. 12 illustrates a flowchart of job information transferring processing.
Figure 13:
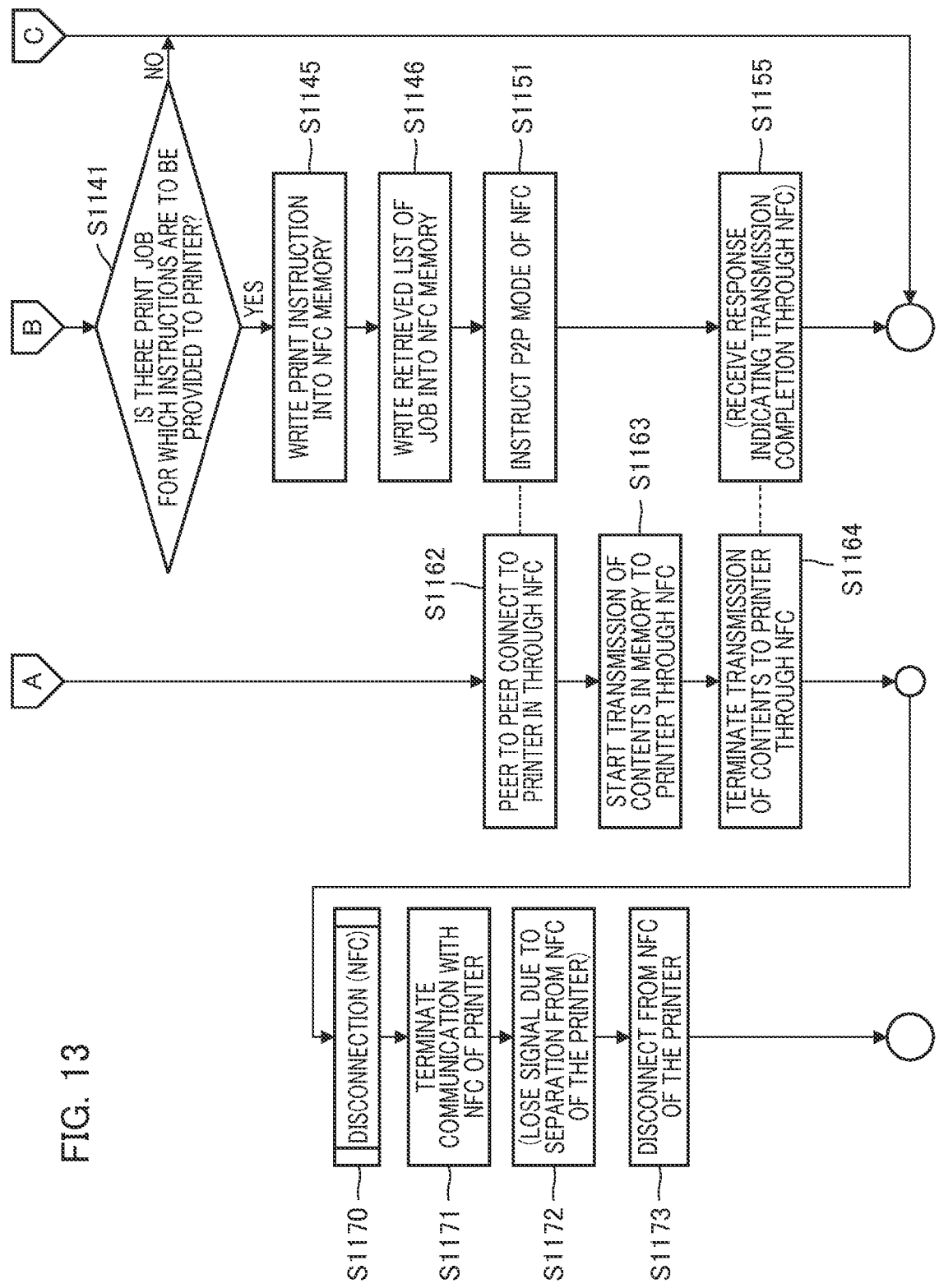
FIG. 13 illustrates a subsequent flowchart of the job information transferring processing.

FIG. 12 and FIG. 13 are flowcharts that are executed by the drive unit 411 and the communication unit 401 of the mobile terminal 2, and correspond to the processing 820. The Web application 30 of the print service 11 is executed by the drive unit 411 of the mobile terminal 2 and controls the communication unit 401. The mobile terminal 2 passes the retrieved list to the printer 3 through the near field communication 7, and provides an instruction for printing.

In S1100, the communication unit 401 starts the communication processing. In S1110, the communication unit 401 starts the connection processing through the NEC 125. In S1111, the communication unit 401 detects a signal by coming close to the NFC of the printer 3 by the user. In S1112, the communication unit 401 connects to the NEC 165 of the printer 3. In S1113, if the communication unit 401 has successfully connected to the NFC 165 of the printer 3, the communication unit 401 initiates communication with the NFC 165 of the printer 3.

In S1120, the mobile terminal 2 starts the tag mode (NEC) processing. In S1121, NFC tag information indicating that the Web application has been activated is transmitted from the printer to the mobile terminal 2 through the NFC. Note that a dotted line in FIG. 12 is a relation line. The dotted line indicates portions related to the processing between the drive unit 411 and the communication unit 401. Here, since the drive unit 411 performs processing in response to an instruction by the communication unit 401, the dotted line indicating the relationship is employed. The dotted lines shown in the subsequent processing in the flowchart are for the relation line.

In S1130, upon receiving the instruction by the communication unit 401, the drive unit 411 starts the processing. In S1131, when the drive unit 411 determines that the Web application of the mobile terminal 2 has already been activated, the processing advances to S1132, and otherwise the processing advances to S1134. In S1132, the drive unit 411 retains the retrieved list 93 of the job for the document selected by the user on the memory. On the other hand, in S1134, the drive unit 411 executes processing from S1020 to S1063. In S1135, when the drive unit 411 determines that the print job exists, the processing advances to S1132, and otherwise the processing advances to S1156. The tag mode (NFC) in S1120 of FIG. 12 means that the Web application 30 of the print service with which the printer itself communicates is automatically activated by the mobile terminal 2. In S1140, the mobile terminal 2 starts the P2P mode (NFC) processing.

In S1141 of FIG. 13, when the drive unit. 411 determines that there is a print job with instructions for the printer. The processing advances to S1145, and otherwise the processing advances to S1156. In S1145, the drive unit 411 writes the print instruction into the printer 3 in a NFC memory (not shown) provided in the NFC 125. In S1146, the drive unit 411 writes the retrieved list of the job into the NFC memory. In the temporarily stored printing, the Web application of the mobile terminal does not always activate. Also, there is a possibility that the print target may be added or changed while the user moves to the printer. Thus, the accuracy for the transfer processing is ensured by writing the retrieved list into the NFC memory when the NFC connection is initiated. In S1151, the drive unit 411 instructs the communication unit 401 to set the P2P mode of the NFC, and causes the communication unit 401 to transmit, to the printer 3, the print instruction and the retrieved list written in the NFC. In S1155, the drive unit 411 receives a response indicating that the data transmission has been completed from the communication unit 401 through the NFC. On the other hand, when there is no print job in S1135, the drive unit 411 does not execute the transfer processing, and terminates the processing.

In S1163, the communication unit 401 connects to the printer peer-to-peer through the NFC 125 in response to the instruction from the drive unit 411. In S1163, the communication unit 401 transmits the content in the NFC memory to the printer 3 through the NFC 125. In S1164, the communication unit 401 terminates the transmission processing to the printer 3 through the NFC 125. Also, the communication unit 401 notifies the drive unit 411 of the transmission completion as a response. In the P2P mode (NFC) processing in S1140, the drive unit 411 may first instruct setting the P2P mode such as the processing in S1151 to the communication unit 401, and then write the data into the NFC memory such as the processing in S1145. The content in the NFC memory is also transmitted to the printer through the NFC 125.

In S1170, the communication unit 401 starts the disconnection (NFC) processing. In S1171, the communication unit 401 terminates communication with the NFC of the printer. In S1172, the communication unit 401 loses the signal due to a separation from the NFC of the printer. In S1173, the communication unit 401 disconnects from the NFC of the printer.

The flowchart has been described in which the drive unit 411 controls the communication unit 35 of the mobile terminal 2 to thereby transfer the retrieved list to the printer 3 through the near field communication 7. As described above, since the processing corresponding to the processing 820 branches for each mode of the near field communication 7, a combined use of another mode, such as a card mode (NFC), is available.

When the Web application 30 of the print service 11 employs the processing 820, the drive unit 411 controls the print selection when printing, and the subsequent print instruction to the printer. The aforementioned processing enables the printer selection and the print instruction for the document to the printer through the near field communication all together when the anywhere printing function is used.

Flowchart of Job Acquisition and Corresponding to Print Processing 830

Figure 14:
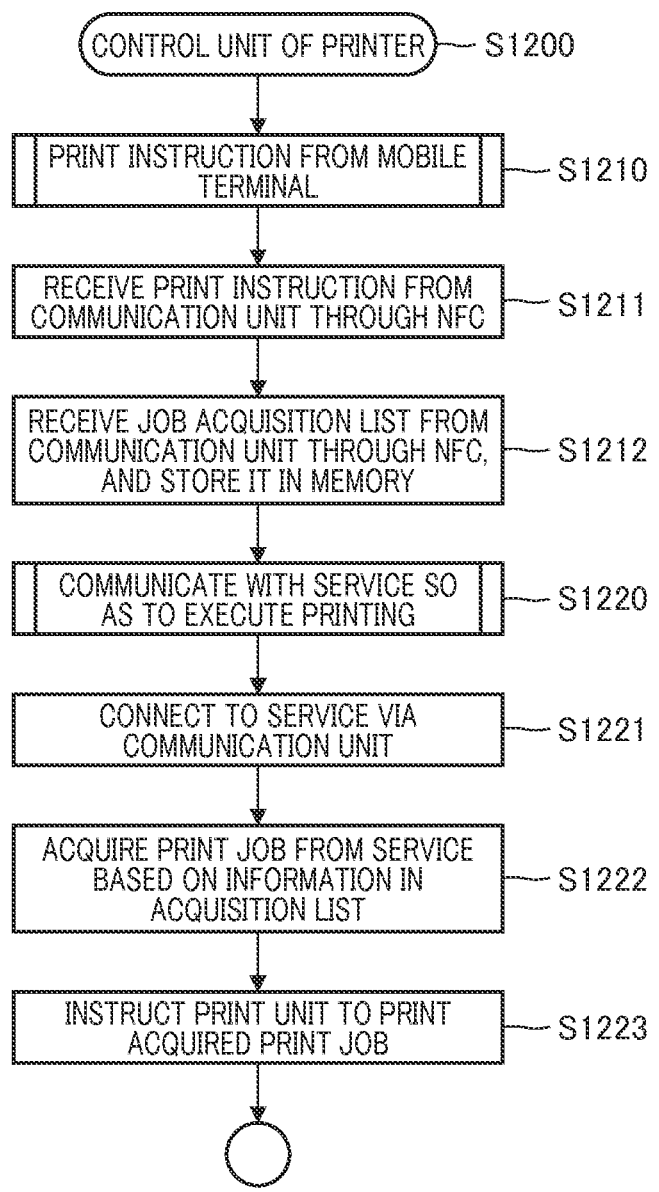
FIG. 14 illustrates a flowchart of job acquisition and print processing.

FIG. 14 is a flowchart that is executed by the control unit 51 of the printer 3 and corresponds to the processing 830. The control unit 51 receives the print instruction and the retrieved list from the mobile terminal 2 through the near field communication 7, and acquires and prints the print job that is stored in the AWP 331 of the print service 11 via the communication unit 53.

In S1210, the control unit 51 starts the processing. In S1211, the control unit 51 receives the print instruction from the communication unit 53 through the NFC 165. In S1212, the control unit 51 receives the retrieved list 93 of the job from the communication unit 53 through the NFC 165, and stores it in the RAM 142, the external memory 163, or the like. In S1220, the control unit 51 communicates with the print service 11 to thereby start the print execution processing. In S1221, the control unit 51 connects from the communication unit 53 to the print service 11 via the network 5. In S1222, the control unit 51 acquires the print job from the print service 11 based on the information of the retrieved list 93. Specifically, the control unit 51 acquires print data based on the job URL and print settings based on the setting URL from the print service 11. In S1223, the control unit 51 instructs the print unit 38 to print the acquired print job.

As described above, the control unit 51 receives the print instruction and the retrieved list from the mobile terminal 2 through the near field communication 7, and acquires and prints the job from the AWP 331 of the print service 11 via the network 5.

If the control unit 51 of the printer 3 employs the processing 830, the control unit 51 receives a small amount of data for acquiring the print job from the mobile terminal 2 through the near field communication 7. The processing according to the aforementioned flowchart enables the printer to acquire the print job from the AWP 331 of the print service 11 and execute the pull printing without the operation to the printer by a user when the instruction for printing is provided from the mobile terminal to the printer with the anywhere printing function.

In the following, the operation of the anywhere printing function in the printing system is summarized. The anywhere printing function and the pull printing prolongs an occupancy time of the operation unit of the printer by a user due to an increase in operation processes including the document selection. Also, in the printing system consisting of the print service, the mobile terminal and the printer having the NFC, it is desirable to acquire the print job by the printer itself.

The present printing system performs the following processing for resolving the above. The mobile terminal controls the selection of the print document such as the processing 810. The near field communication units of the mobile terminal and the printer pass the print instruction or the job information doubling as the printer selection. The printer executes printing based on the instruction such as the processing 830.

With these processes, the anywhere printing in the present embodiment function reduces the number of operations leading to the print completion. When the anywhere printing function in the present embodiment is used, a user only needs to select a document with the terminal. The touch operation through the NFC doubles as transmission/reception of the printer selection and the print instruction. Since the user does not operate the panel of the printer, the operation unit is not occupied. According to the printing system in the present embodiment, the anywhere printing function is realized, with a number of operations equal to that of normal printing. Therefore, a control function saving the redundant selection of the print document when printing and the redundant operation to the printer is provided to the user, which enhances convenience.

Also, in the printing system in the present embodiment, the printer itself acquires the print job without receiving the print data through the NFC communication. The printer performs the pull printing operation suitable for the printing system consisting of the print service, the mobile terminal and the printer having the NFC as well as a cloud printing.

Second Embodiment

Third Example of Print Job Screen Display

A description will be given of a screen example of the print service 11 that is displayed on the mobile terminal 2 with reference to FIG. 15. A description will be given of a screen operation by the print service 11 when the printer is equipped with an encoding coed reader/writer other than a NFC reader/writer.

Similar to the job list screen 65 in FIG. 6, the job list screen 65 is displayed on the screen of the mobile terminal. When a user uses a printer 2 equipped with a two-dimensional codes reader/writer, the user presses a "Code . . . " button arranged on the job list screen 65. The screen transits to (1312) in response to the pressing, and a "Code" screen 66 is displayed on the screen of the mobile terminal 2. The "Code" screen 66 is displayed on the screen in the floating window of the mobile terminal 2. A two-dimensional code 1314 is displayed on the "Code" screen 66 as the encoding code. The same information as that when the aforementioned near field communication is used is encoded in the two-dimensional code 1314. Hence, when the user brings the "Code" screen 66 into contact with the two-dimensional codes reader/writer of the printer 3, the mobile terminal 2 can pass, to the printer 3, the same information as that when the near field communication is used. A slider 1316 at the bottom of the "Code" screen 66 is used for switching a two-dimensional code type or scrolling codes when information is encoded in a plurality of the two-dimensional codes.

As described above, by preparing the job list screen 65 and the "Code" screen 66 shown in FIG. 15, even if the terminal 2 is not equipped with the NFC 12, the printing system can be applied when the printer 3 is equipped with the two-dimensional codes reader/writer, Fourth Example of Print Job Screen Display A description will be given of a screen example by the print service displayed on the mobile terminal 2 with reference to FIG. 16. A description will be given of a screen operation by the print service 11 when the printer 3 is equipped with the two-dimensional coded reader/writer other than the NFC reader/writer.

Figure 15:
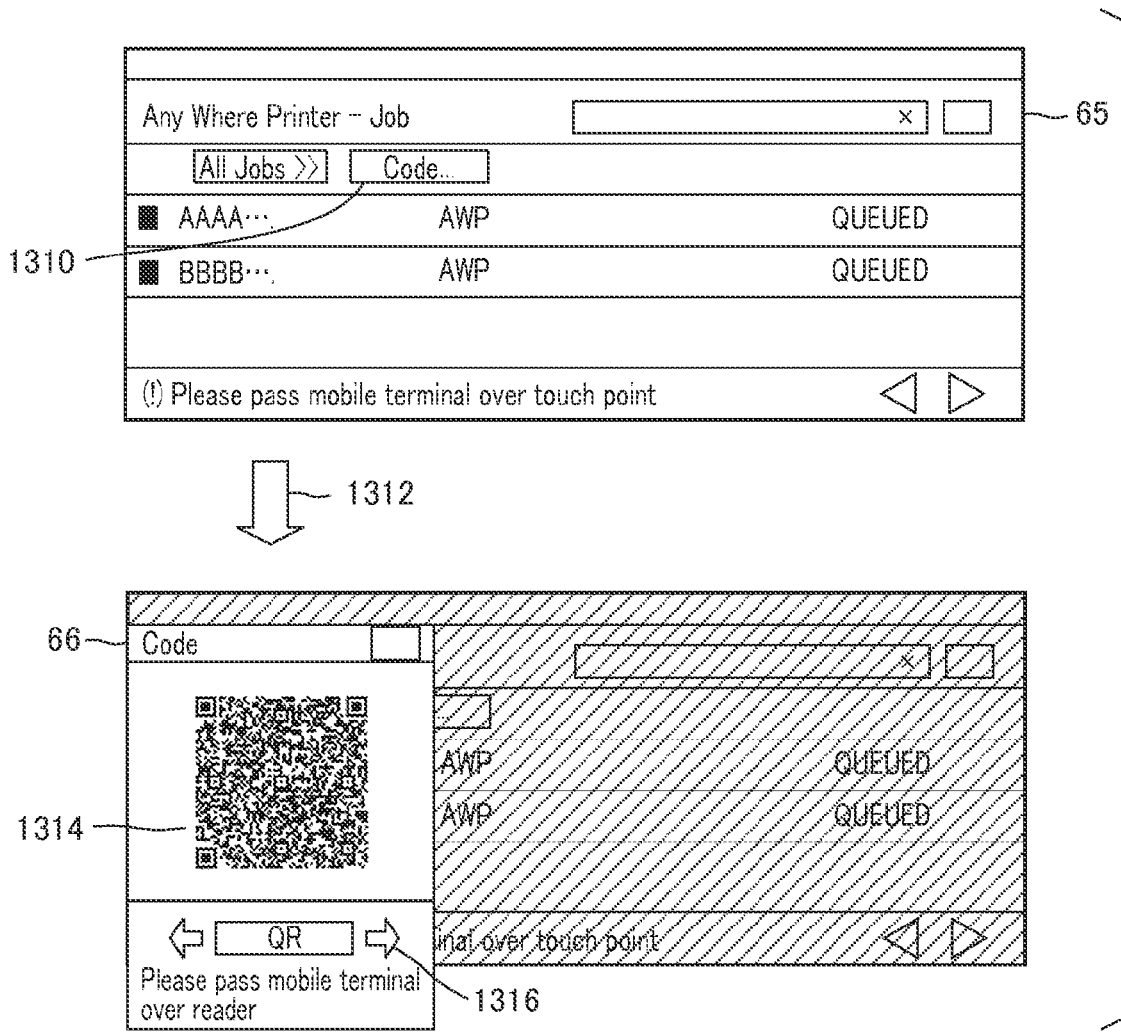
FIG. 15 illustrates an example of a print job screen display by a printing system in a second embodiment.

Similar to FIG. 6 and FIG. 15 described above, the job list screen is displayed on the mobile terminal 2. The two-dimensional code 1314 is displayed on the job list screen 68. Hence, when the user makes the job list screen 68 contact the two-dimensional codes reader/writer of the printer 3, the terminal 2 can pass, to the printer 3, the same information as that when the near field communication is used. Other contents are the same with that described with reference to FIG. 15, and thus the explanation thereof is omitted.

Figure 16:
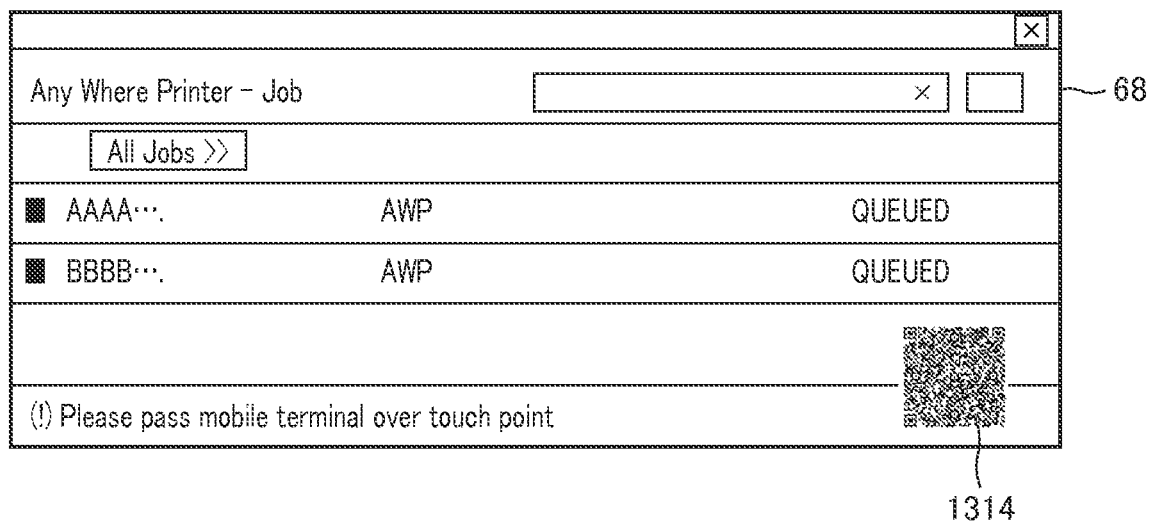
FIG. 16 illustrates another example of the print job screen display by a printing system in a second embodiment.

As described above, by preparing the job list screen 68 shown in FIG. 16, the present printing system, can be applied when the printer is equipped with the two-dimensional codes reader/writer. In this embodiment, a configuration is applied in FIG. 15 and FIG. 16, where the printer 3 is equipped with the two-dimensional codes reader/writer, however, the same effect is obtained when the printer 3 employs another method, for example, reading the code with a scanner, reading the code of a printed sheet, or the like.

Aspects of the present invention can also be realized by a computer of a system or device (or devices such as a CPU or MPU) that reads out and executes a program recorded on a memory device to perform the functions of the above-described embodiments, and by a method, the steps of which are performed by a computer of a system or device by, for example, reading out and executing a program recorded on a memory device to perform the functions of the above-described embodiments. For this purpose, the program is provided to the computer for examine via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-028709 filed Feb. 18, 2013, which is hereby incorporated by reference herein in its entirety.

What is claimed is:

1. A printing system comprising:
a print service device that transmits a print job generated based on document data to an image processing device via a network;
a terminal device that includes a non-contact near field communication unit; and
the image processing device that includes the non-contact near field communication unit,
wherein the terminal device comprises:
an instruction unit configured to provide an instruction for printing to the print service device without specifying the image processing device that executes printing in response to a selection of the document data; and
a display unit configured to display a screen for a job list for selecting the document data,
wherein the print service device comprises:
a transmission unit configured to transmit a command for causing the terminal device to write, in the near field communication unit of the terminal device, storage information related to a storage location on the network of the print job generated upon receiving the instruction,
wherein the image processing device comprises:
an acquisition unit configured to initiate communication through the near field communication unit of the image processing device so as to acquire the storage information written in the near field communication unit of the terminal device; and
a print unit configured to acquire the print job based on the storage information acquired by the acquisition unit and print the print job, and
wherein the display unit displays the screen in a floating window or a pop up window when the print service device has been instructed to print without specifying the image processing device that executes printing.

2. The printing system according to claim 1, wherein the print service device comprises a storage unit configured to store the generated print job in the storage location by associating it with information of the terminal device when the instruction unit provides the instruction for printing without specifying the image processing device that executes printing,
wherein the terminal device comprises a request unit configured to request a job list of print jobs stored in the storage location when a printing of multiple document data is instructed,
wherein the storage unit transmits, to the terminal device, the job list related to all of the print jobs in response to the request for the job list, and
wherein the instruction unit instructs the print service device to print document data corresponding to one or more the print jobs selected from among the print jobs included in the acquired job list.

3. The printing system according to claim 1, wherein the terminal device further comprises a writing unit configured to write the storage information in the near field communication unit of the terminal device based on the command transmitted by the transmission unit when initiating the communication with the image processing device through the near field communication unit, and
wherein the near field communication unit of the terminal device transmits the written storage information to the near field communication unit of the image processing device.

4. The printing system according to claim 1, wherein the storage information includes a URL indicating the storage location on the network of the print job.

5. The printing system according to claim 1, wherein the non-contact near field communication unit is at least any of an NFC reader/writer or an encoding reader/writer.

6. The printing system according to claim 5, wherein the non-contact near field communication unit is the encoding reader/writer, and
wherein the display unit displays an encoding code including the storage information related to the storage location on the network of the print job generated in response to the instruction on a screen for selecting the document data or the screen in the floating window.

7. A control method of a printing system comprising:
a print service device that transmits a print job generated based on document data to an image processing device via a network;
a terminal device that includes a non-contact near field communication unit; and
the image processing device that includes the non-contact near field communication unit,
the control method comprising:
   instructing, by the terminal device, the print service device to print without specifying the image processing device that executes printing in response to a selection of the document data;
   displaying, by the terminal device, a screen for a job list for selecting the document data;
   transmitting, by the print service, a command for causing the terminal device to write, in the near field communication unit of the terminal device, storage information related to a storage location on the network of the print job generated upon receiving the instruction;
   initiating, by the image processing device, communication through the near field communication unit of the image processing device so as to acquire the storage information written in the near field communication unit of the terminal device; and
   acquiring, by the image processing device, the print job based on the acquired storage information; and
   printing the print job,
wherein the screen is displayed in a floating window or a pop up window when the print service device has been instructed to print without specifying the image processing device that executes printing.

8. A non-transitory storage medium on which is stored a computer program for making a computer execute a control method of a printing system comprising:
a print service device that transmits a print job generated based on document data to an image processing device via a network;
a terminal device that includes a non-contact near field communication unit; and
the image processing device that includes the non-contact near field communication unit,
the control method comprising:
   instructing, by the terminal device, the print service device to print without specifying the image processing device that executes printing in response to a selection of the document data;
   displaying, by the terminal device, a screen for a job list for selecting the document data;
   transmitting, by the print service, a command for causing the terminal device to write, in the near field communication unit of the terminal device, storage information related to a storage location on the network of the print job generated upon receiving the instruction;
   initiating, by the image processing device, communication through the near field communication unit of the image processing device so as to acquire the storage information written in the near field communication unit of the terminal device;
   acquiring, by the image processing device, the print job based on the acquired storage information; and
   printing the print job,
wherein the screen is displayed in a floating window or a pop up window when the print service device has been instructed to print without specifying the image processing device that executes printing.

9. A printing system comprising:
a print service device that transmits a print job generated based on document data to an image processing device via a network;
a terminal device that includes a non-contact near field communication unit; and
the image processing device that includes the non-contact near field communication unit,
wherein the terminal device comprises:
   an instruction unit configured to provide an instruction for printing to the print service device without specifying the image processing device that executes printing in response to a selection of the document data; and
   a display unit configured to display a screen for a job list for selecting the document data,
wherein the print service device comprises:
   a transmission unit configured to transmit a command for causing the terminal device to write, in the near field communication unit of the terminal device, storage information related to a storage location on the network of the print job generated upon receiving the instruction,
wherein the image processing device comprises:
   an acquisition unit configured to initiate communication through the near field communication unit of the image processing device so as to acquire the storage information written in the near field communication unit of the terminal device; and
   a print unit configured to acquire the print job based on the storage information acquired by the acquisition unit and print the print job, and
wherein the display unit displays the screen when the print service device has been instructed to print without specifying the image processing device that executes printing.

* * * * *